United States Patent [19]
Yamanashi

[11] Patent Number: 5,442,485
[45] Date of Patent: Aug. 15, 1995

[54] ZOOM LENS SYSTEM

[75] Inventor: Takanori Yamanashi, Tokyo, Japan

[73] Assignee: Olympus Optical Co., Ltd., Tokyo, Japan

[21] Appl. No.: 136,099

[22] Filed: Oct. 14, 1993

[30] Foreign Application Priority Data

Oct. 15, 1992 [JP] Japan ................... 4-301630

[51] Int. Cl.6 ............................................. G02B 15/14
[52] U.S. Cl. ..................... 359/683; 359/676; 359/714; 359/765
[58] Field of Search ................ 359/676, 714, 765, 683

[56] References Cited

U.S. PATENT DOCUMENTS

| | | | |
|---|---|---|---|
| 3,975,089 | 8/1976 | Betensky | 359/688 |
| 4,113,356 | 9/1978 | Matsubara | 359/683 |
| 4,299,454 | 11/1981 | Betensky | 359/687 |
| 4,437,732 | 3/1984 | Ishiyama | 359/685 |
| 4,576,445 | 3/1986 | Inadome | 359/688 |
| 4,812,024 | 3/1989 | Mukaiya | 359/683 |
| 4,832,471 | 5/1989 | Humano | 359/683 |
| 4,846,563 | 7/1989 | Mukaiya | 359/683 |
| 5,061,051 | 10/1991 | Miyamae | 359/683 |
| 5,095,387 | 3/1992 | Horiuchi | 359/676 |
| 5,301,064 | 4/1994 | Sugi et al. | 359/676 |

FOREIGN PATENT DOCUMENTS

| | | | |
|---|---|---|---|
| 55-62419 | 5/1980 | Japan . | |
| 57-2014 | 1/1982 | Japan . | |
| 58-93022 | 6/1983 | Japan . | |
| 0118510 | 5/1990 | Japan | 359/676 |
| 360409 | 9/1991 | Japan . | |
| 404186210 | 7/1992 | Japan | 359/676 |

Primary Examiner—Georgia Y. Epps
Assistant Examiner—Evelyn A. Lester
Attorney, Agent, or Firm—Cushman, Darby & Cushman

[57] ABSTRACT

A zoom lens system comprising at least five lens units, in order from the object side, of a first lens unit having a positive refractive power, a second lens unit having a negative refractive power, a third lens unit having a negative refractive power, a fourth lens unit having a positive refractive power and a fifth lens unit having a positive refractive power. This zoom lens system is configured so as to change a magnification thereof by moving the first through fifth lens units, and has wide field angles, a high vari-focal ratio and a compact size.

3 Claims, 17 Drawing Sheets

FIG. IA
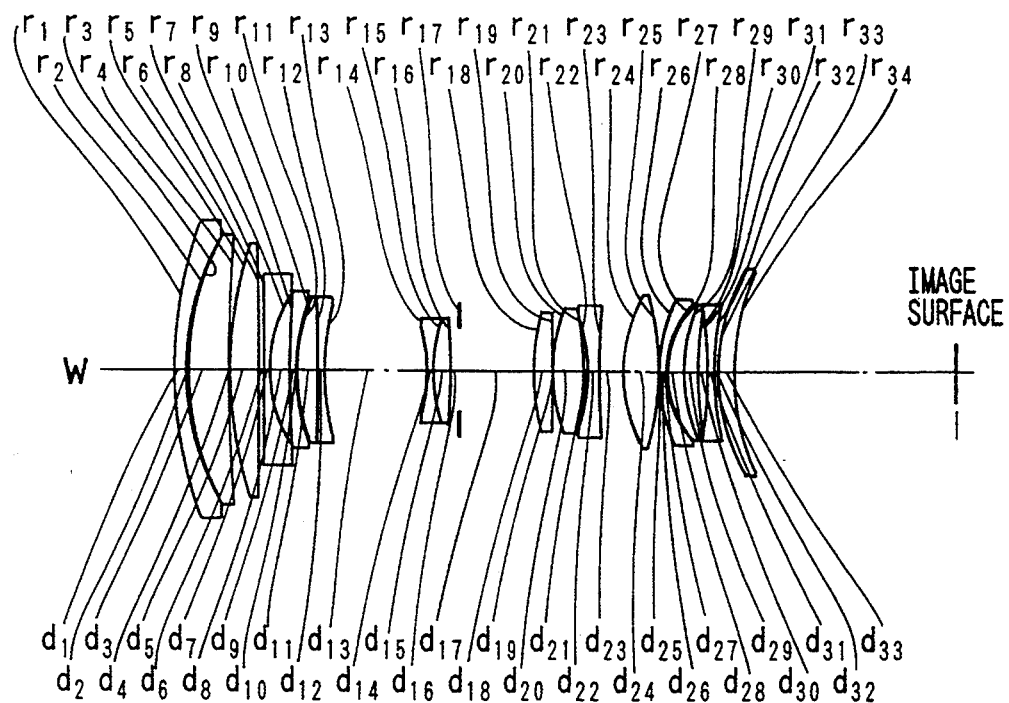
FIG. IB
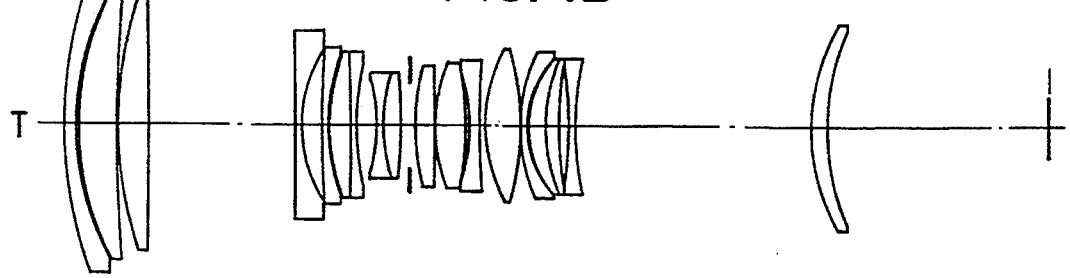

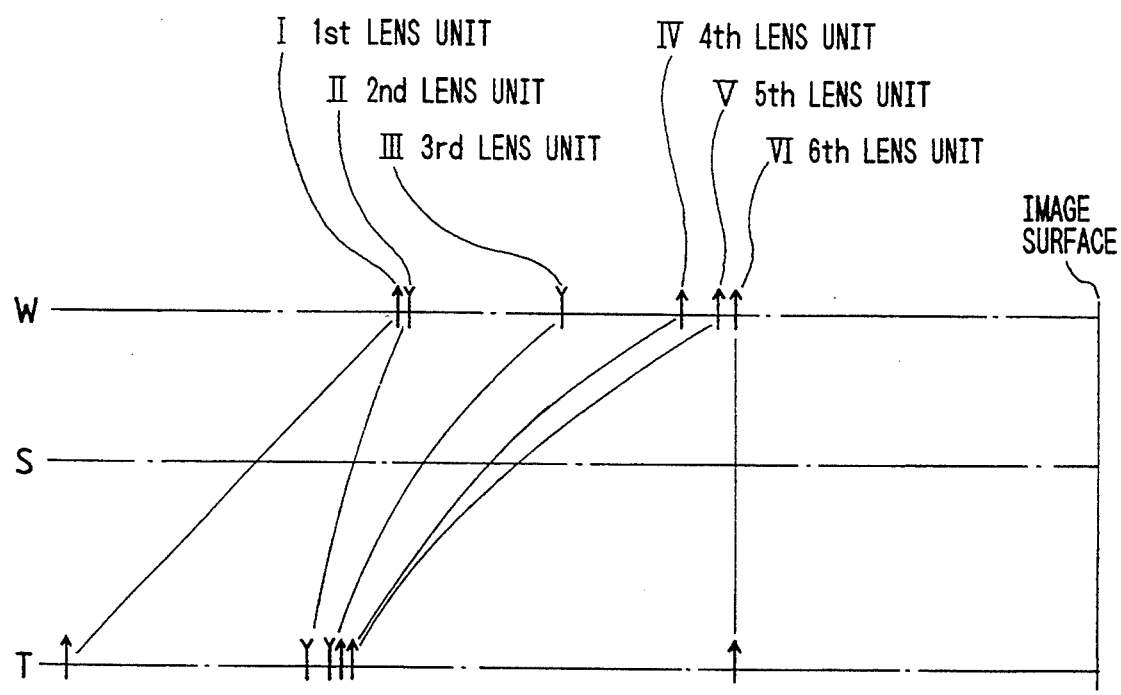

SPHERICAL ABERRATION

ASTIGMATISM

LATERAL CHROMATIC ABERRATION

DISTORTION

SPHERICAL ABERRATION

ASTIGMATISM

LATERAL CHROMATIC ABERRATION

DISTORTION

FIG. 9A
SPHERICAL ABERRATION
FIG. 9B
ASTIGMATISM
FIG. 9C
LATERAL CHROMATIC ABERRATION
FIG. 9D
DISTORTION
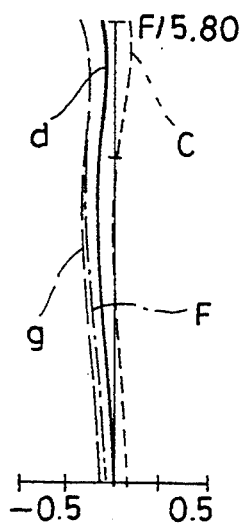
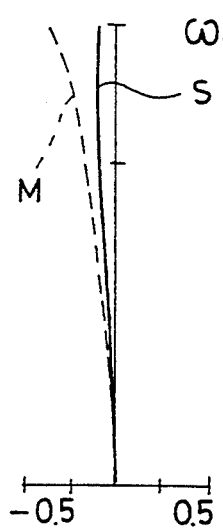
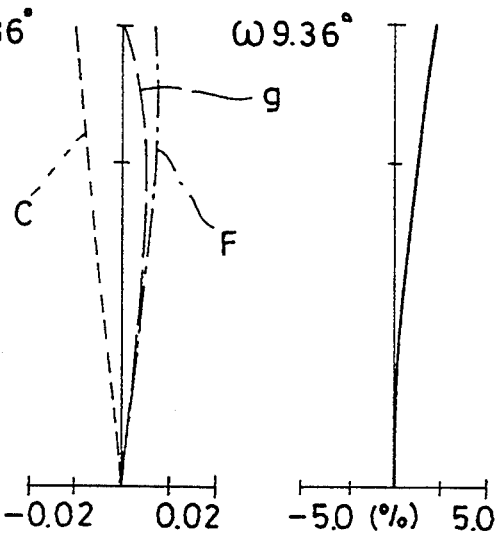
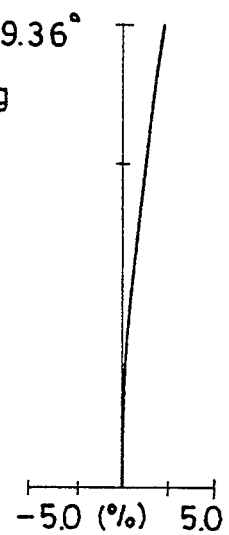
FIG. 10A
SPHERICAL ABERRATION
FIG. 10B
ASTIGMATISM
FIG. 10C
LATERAL CHROMATIC ABERRATION
FIG. 10D
DISTORTION
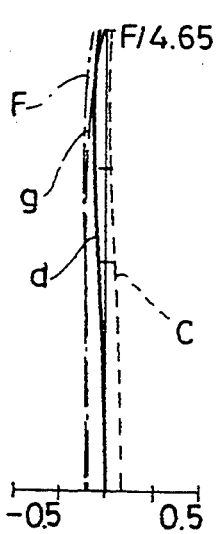
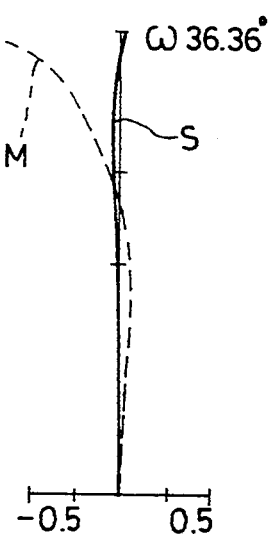
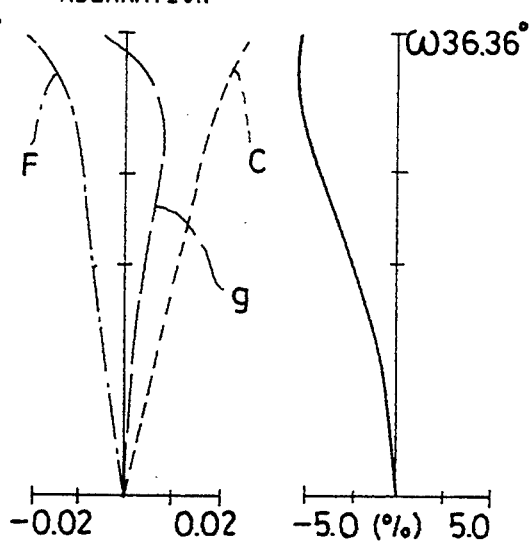
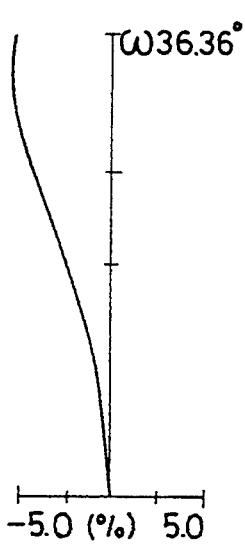

FIG. 11A
SPHERICAL ABERRATION
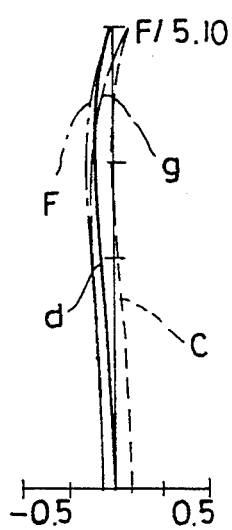
FIG. 11B
ASTIGMATISM
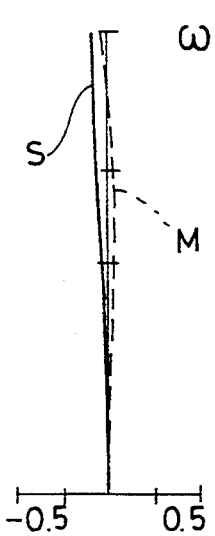
FIG. 11C
LATERAL CHROMATIC ABERRATION
FIG. 11D
DISTORTION
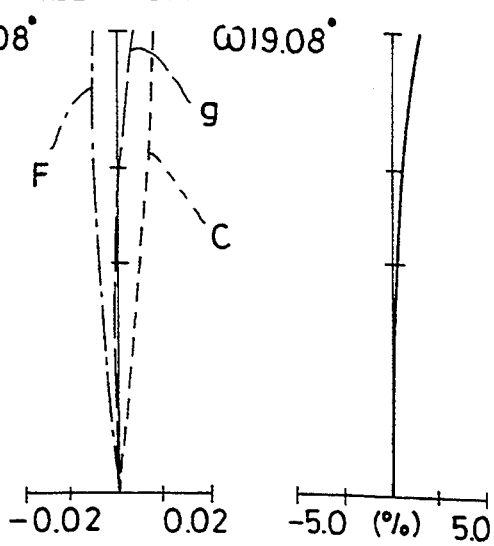
FIG. 12A
SPHERICAL ABERRATION
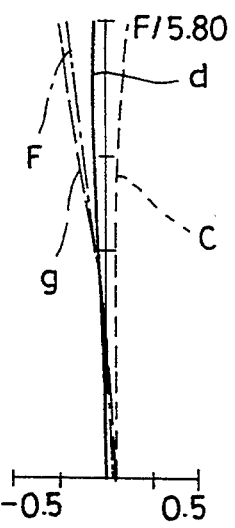
FIG. 12B
ASTIGMATISM
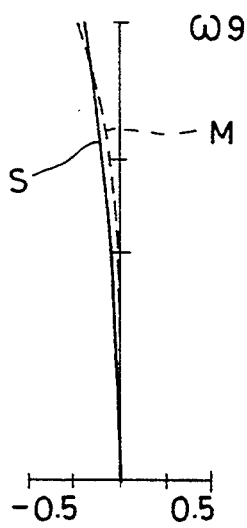
FIG. 12C
LATERAL CHROMATIC ABERRATION
FIG. 12D
DISTORTION
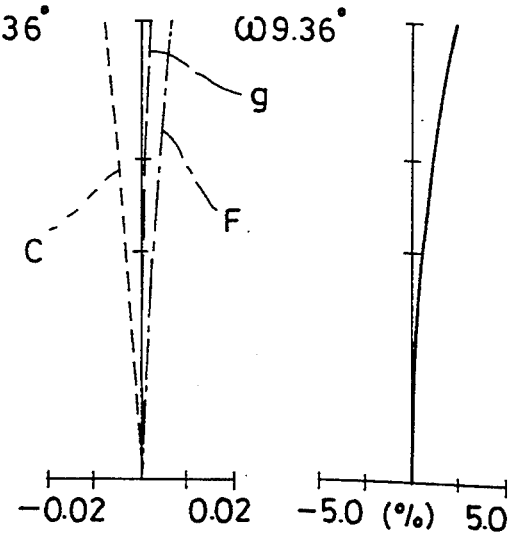

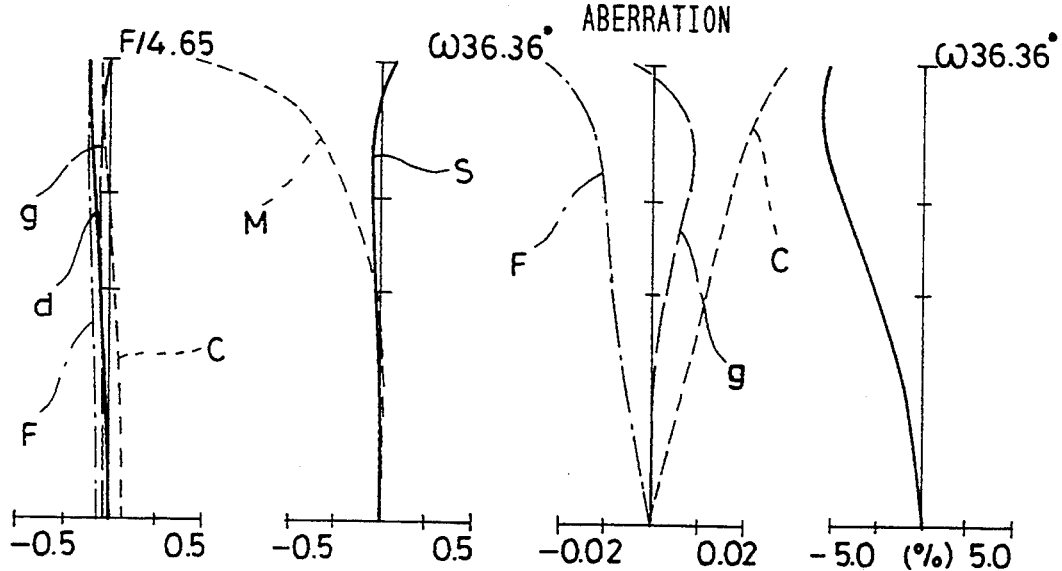
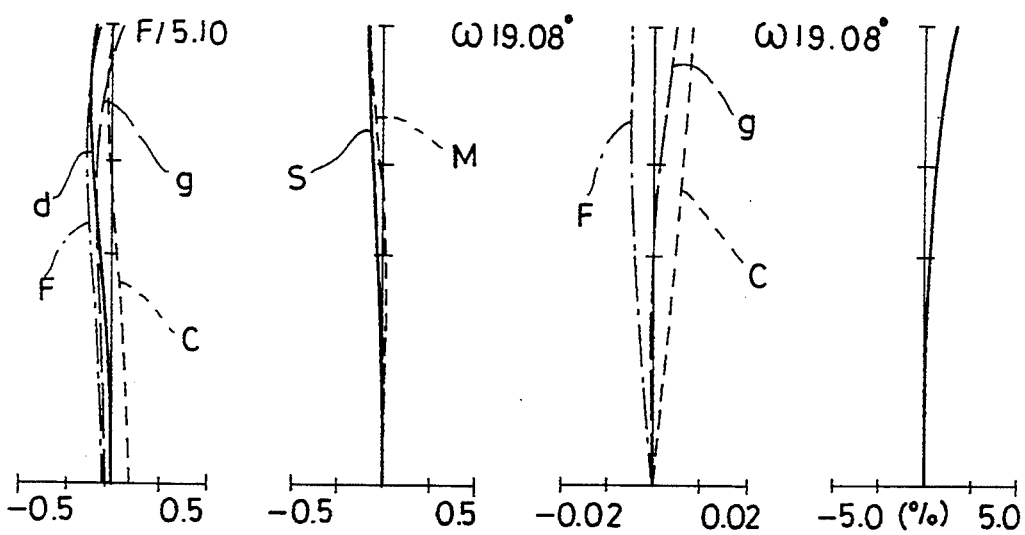

FIG. 15A
SPHERICAL ABERRATION
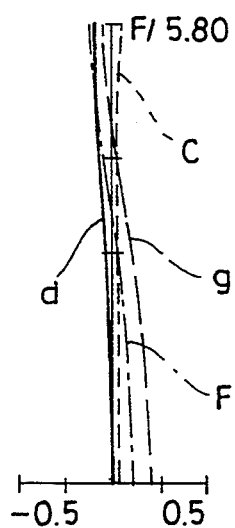
FIG. 15B
ASTIGMATISM
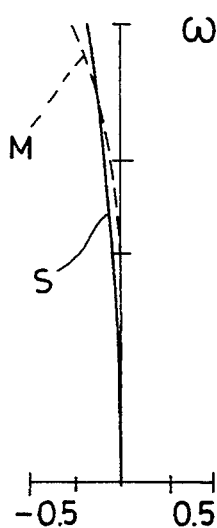
FIG. 15C
LATERAL CHROMATIC ABERRATION
FIG. 15D
DISTORTION
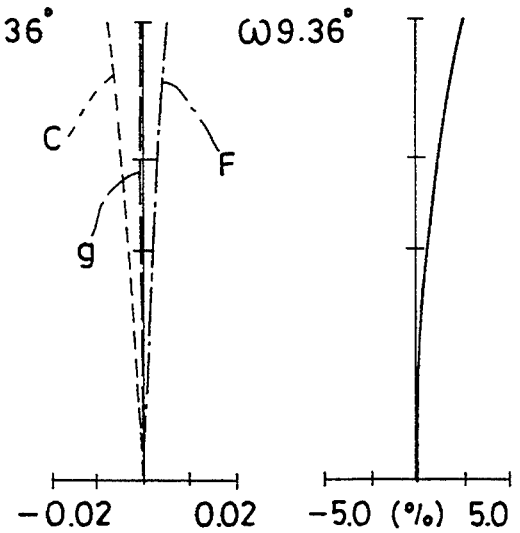
FIG. 16A
SPHERICAL ABERRATION
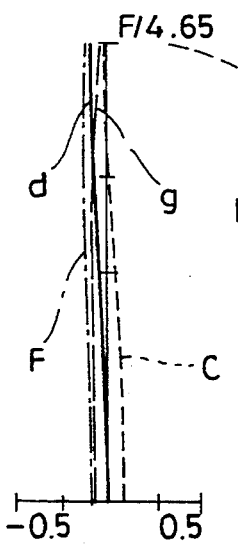
FIG. 16B
ASTIGMATISM
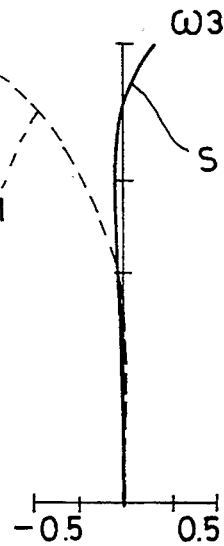
FIG. 16C
LATERAL CHROMATIC ABERRATION
FIG. 16D
DISTORTION
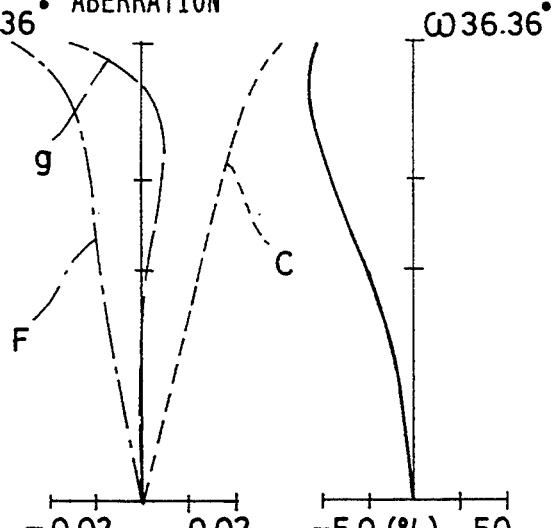

FIG.17A
SPHERICAL ABERRATION
FIG.17B
ASTIGMATISM
FIG.17C
LATERAL CHROMATIC ABERRATION
FIG.17D
DISTORTION
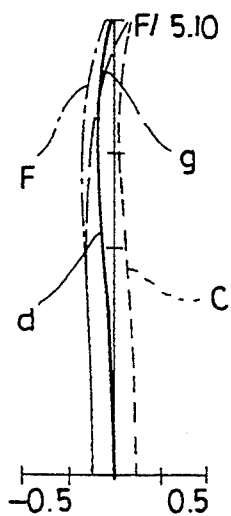
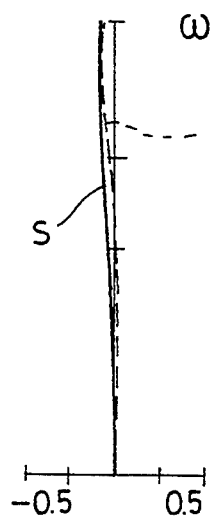
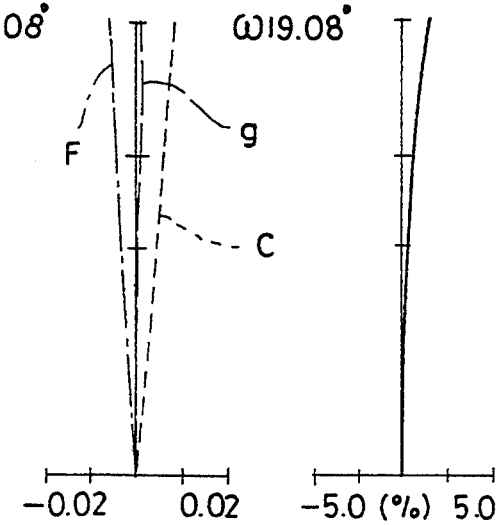
FIG.18A
SPHERICAL ABERRATION
FIG.18B
ASTIGMATISM
FIG.18C
LATERAL CHROMATIC ABERRATION
FIG.18D
DISTORTION
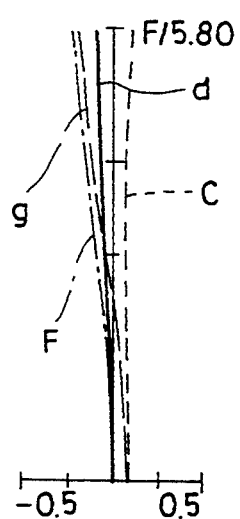
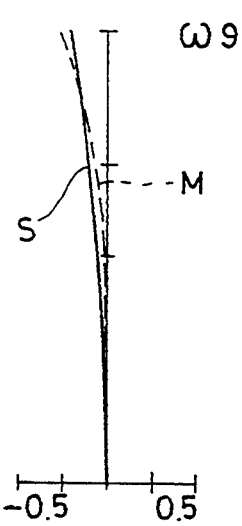
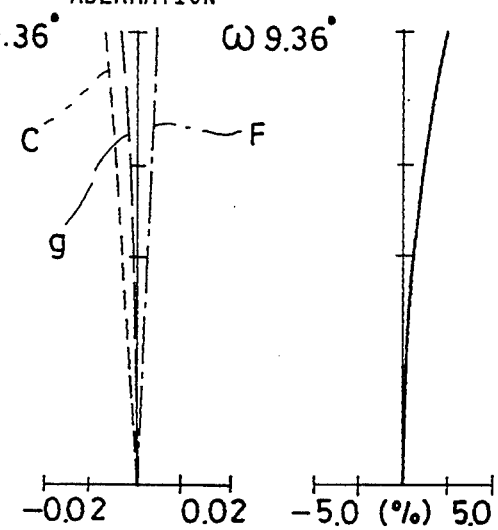

FIG. 19A
SPHERICAL ABERRATION
FIG. 19B
ASTIGMATISM
FIG. 19C
LATERAL CHROMATIC ABERRATION
FIG. 19D
DISTORTION
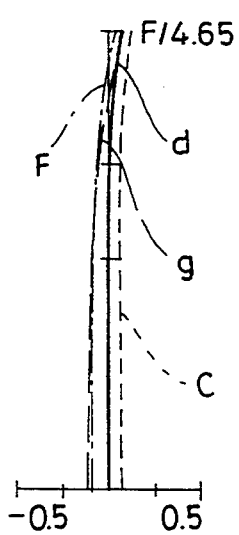
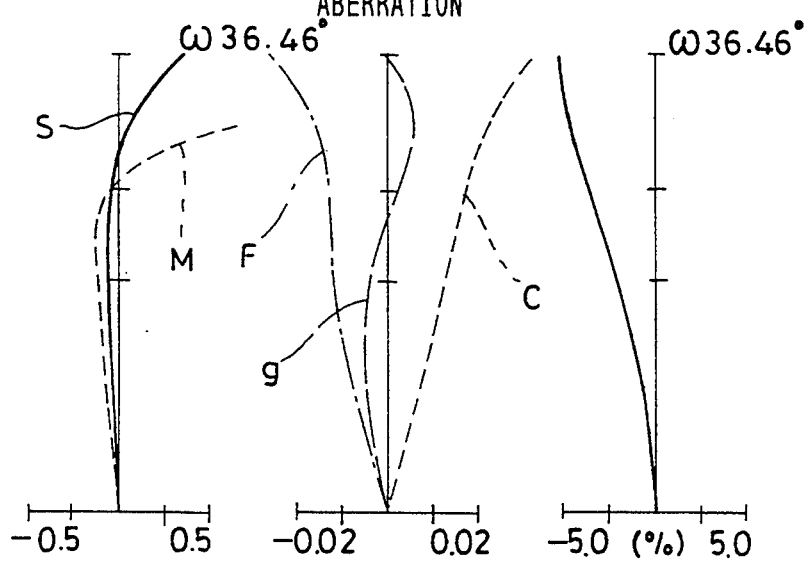
FIG. 20A
SPHERICAL ABERRATION
FIG. 20B
ASTIGMATISM
FIG. 20C
LATERAL CHROMATIC ABERRATION
FIG. 20D
DISTORTION
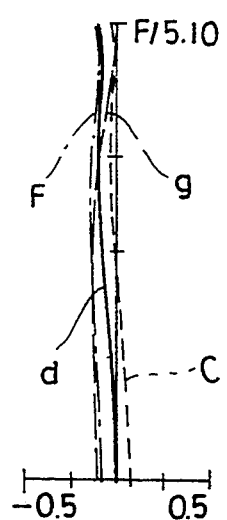
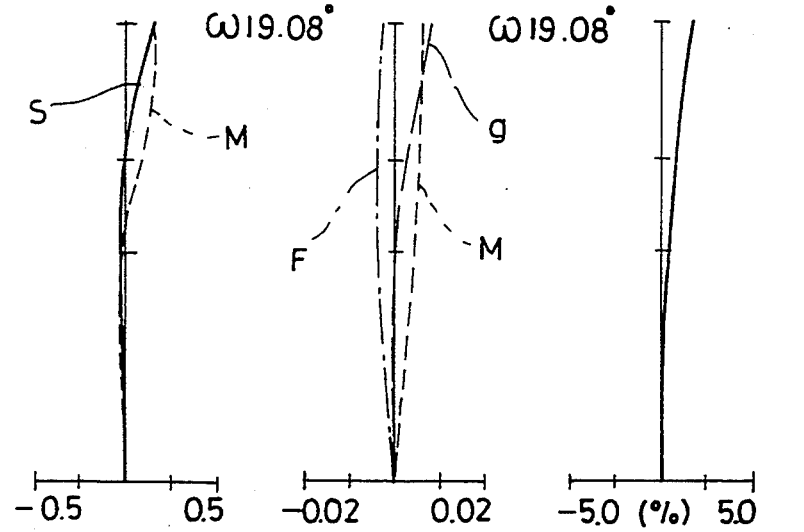

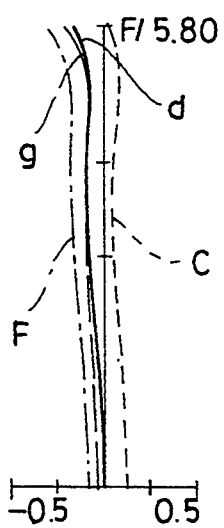
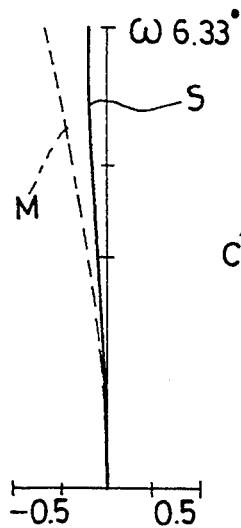
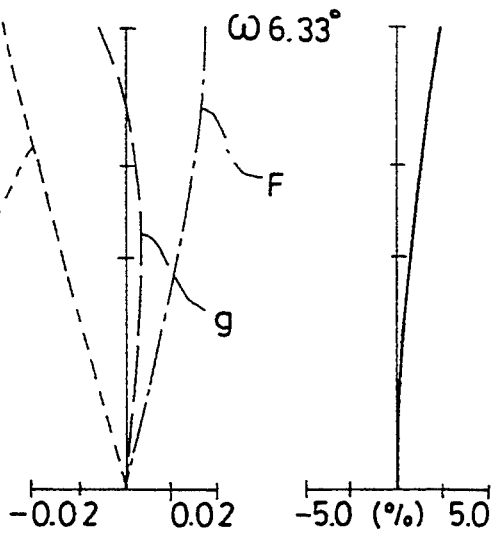
FIG. 21A SPHERICAL ABERRATION
FIG. 21B ASTIGMATISM
FIG. 21C LATERAL CHROMATIC ABERRATION
FIG. 21D DISTORTION
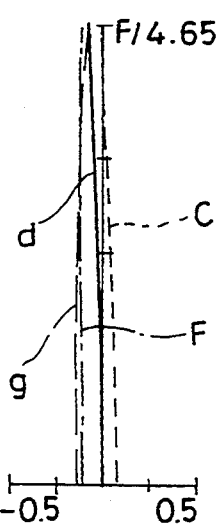
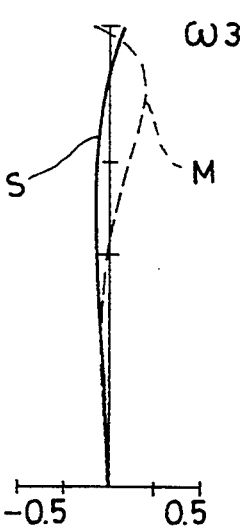
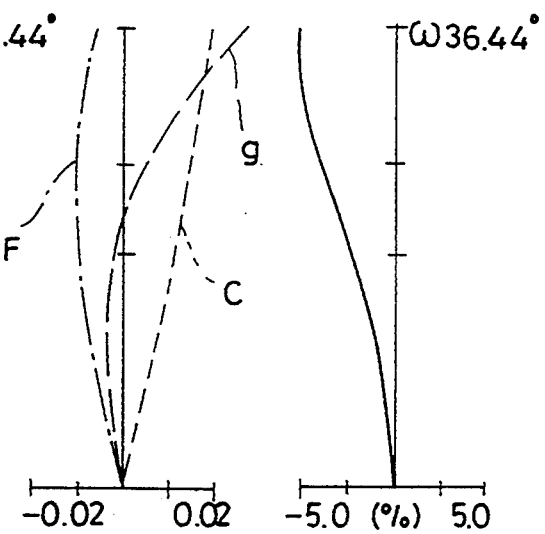
FIG. 22A SPHERICAL ABERRATION
FIG. 22B ASTIGMATISM
FIG. 22C LATERAL CHROMATIC ABERRATION
FIG. 22D DISTORTION

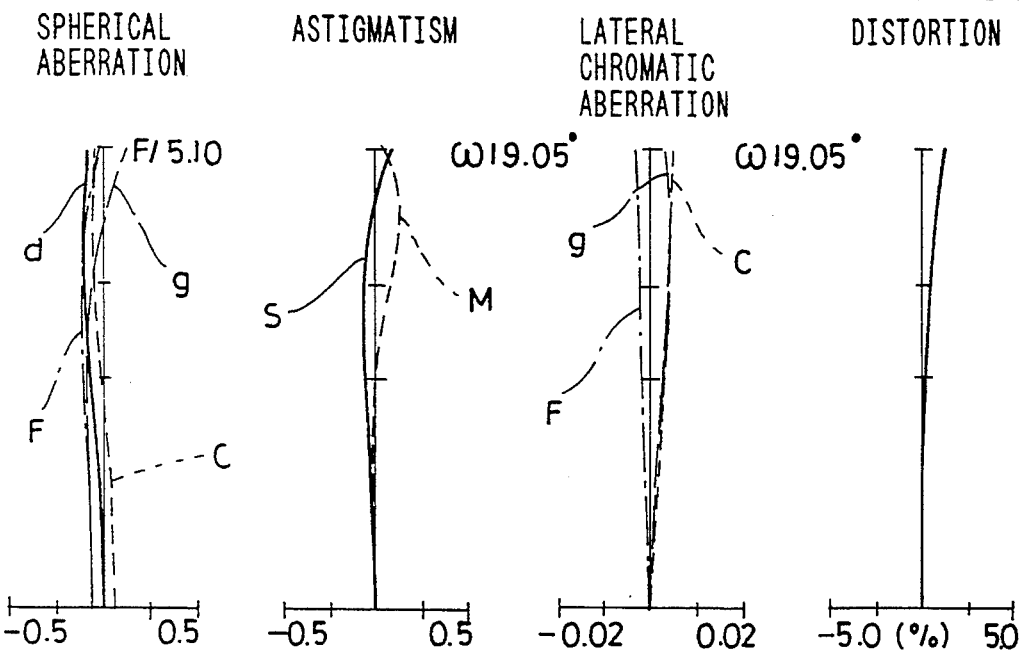
FIG. 23A SPHERICAL ABERRATION
FIG. 23B ASTIGMATISM
FIG. 23C LATERAL CHROMATIC ABERRATION
FIG. 23D DISTORTION
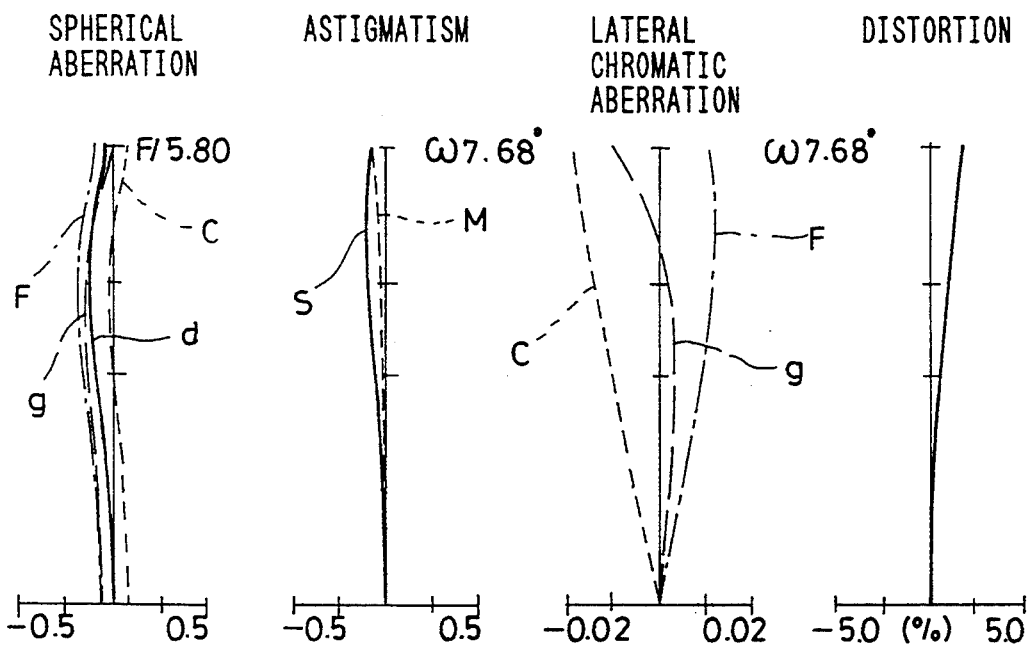
FIG. 24A SPHERICAL ABERRATION
FIG. 24B ASTIGMATISM
FIG. 24C LATERAL CHROMATIC ABERRATION
FIG. 24D DISTORTION

FIG.25A
SPHERICAL ABERRATION
FIG.25B
ASTIGMATISM
FIG.25C
LATERAL CHROMATIC ABERRATION
FIG.25D
DISTORTION
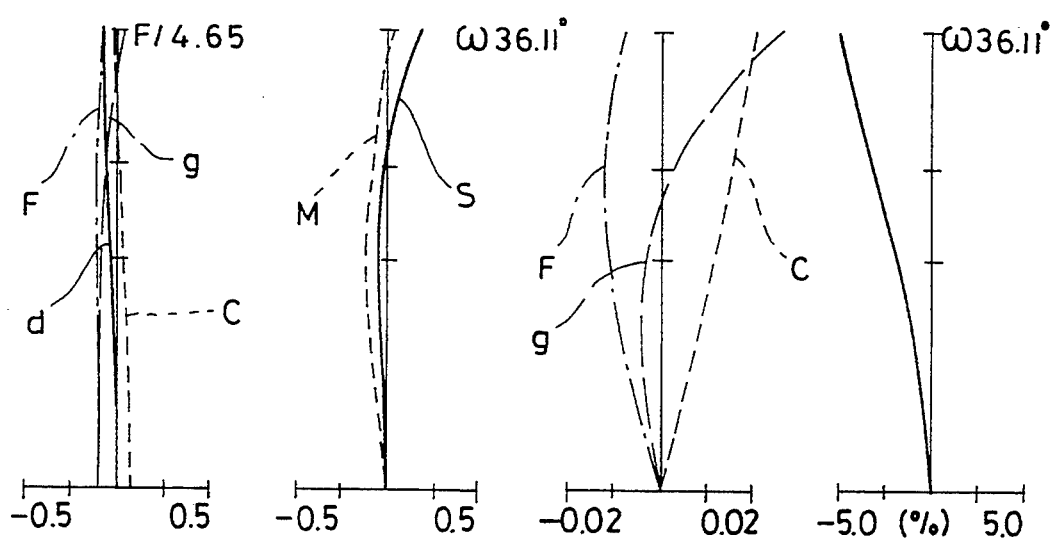
FIG.26A
SPHERICAL ABERRATION
FIG.26B
ASTIGMATISM
FIG.26C
LATERAL CHROMATIC ABERRATION
FIG.26D
DISTORTION
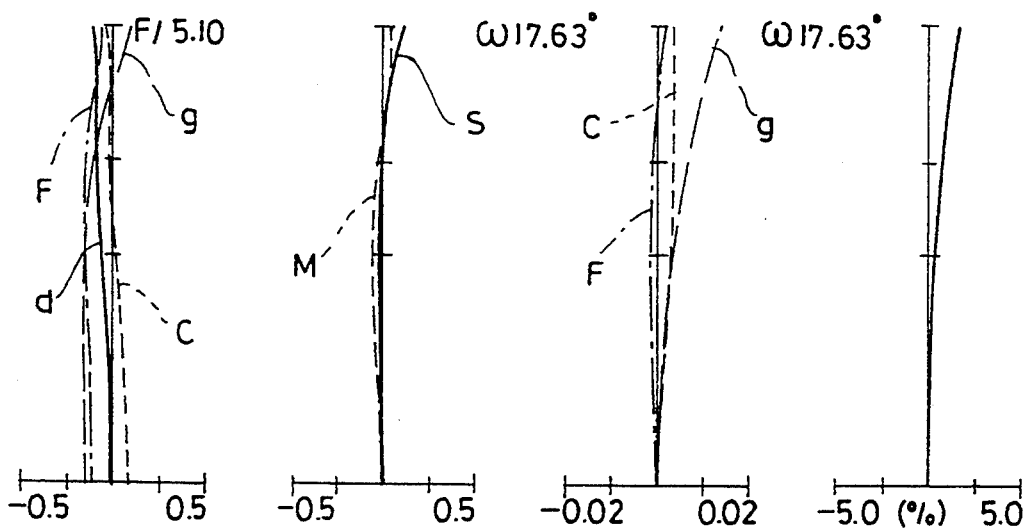

SPHERICAL ABERRATION

ASTIGMATISM

LATERAL CHROMATIC ABERRATION

DISTORTION

ZOOM LENS SYSTEM

Background of the Invention a) Field of the Invention

The present invention relates to a zoom lens system which has a range of field angles covering one as wide as 73° and a high vari-focal ratio.

b) Description of the Prior Art

As a conventional example of zoom lens systems which have high vari-focal ratios and field angles converging wide field angles, there is known a lens system which was disclosed by Japanese Patent Kokai Publication No. Sho 57-2,014. This zoom lens system comprises five lens units, in order from the object side, of a positive lens unit, a negative lens unit, a positive lens unit, a negative lens unit and a positive lens unit. Further, known as another example is a zoom lens system proposed by Japanese Patent Kokai Publication No. Sho 55-62,419. This zoom lens system has a high vari-focal ratio, and consists of four lens units, in order from the object side, of a positive lens unit, a negative lens unit, a positive lens unit and a positive lens unit.

Out of the conventional examples mentioned above, the former zoom lens system has a defect that it has a large total length and uses a front lens element having a large diameter.

Further, the latter zoom lens system has a drawback that it allows characteristics of an image surface thereof to be varied by zooming in addition to a fact that the zoom lens system has a large total length and uses a front lens element having a large diameter.

In case of such a zoom lens system which consists, in order from the object side, of a first positive lens unit, a second negative lens unit, a third positive lens unit and a fourth positive lens unit, or has a fundamental composition having a positive-negative-positive-positive refractive power distribution, the second lens unit must be configured elaborately since this lens unit must have a strong refractive power for correcting curvature of field. Further, each of the lens units must have a strong refractive power for configuring the zoom lens system compact, thereby resulting in degradation of offaxial optical performance of the zoom lens system.

Furthermore, there is known a zoom lens system which consists, in order from the object side, of a first positive lens unit, a second negative lens unit, a third negative lens unit and a fourth positive lens unit, or has a positive-negative-negative-positive refractive power distribution as exemplified by a zoom lens system disclosed by Japanese Patent Kokai Publication No. Sho 58-93,022. However, a zoom lens system of this type has low offaxial optical performance and cannot have sufficiently high imaging performance since the fourth lens unit has a large diameter due to a fact that rays coming from the third lens unit are divergent.

SUMMARY OF THE INVENTION

A primary object of the present invention is to provide a zoom lens system which has a high vari-focal ratio, uses a front lens component having a small diameter and is short in a total length thereof.

The zoom lens system according to the present invention comprises at least five lens units, in order from the object side, of a first lens unit having a positive refractive power, a second lens unit having a negative refractive power, a third lens unit having a negative refractive power, a fourth lens unit having a positive refractive power and a fifth lens unit having a positive refractive power. The zoom lens system according to the present invention is configured so as to change a magnification thereof from a wide position to a tele position by moving the first through fifth lens units along an optical axis and satisfy the following conditions (1), (2) and (3):

(1) $0.5 < -f_{123W}/f_W < 2.0$ (2) $0.3 < f_{45W}/f_W < 2.5$ (3) $1.5 (\beta_{2T} \cdot \beta_{3T})/(\beta_{2W} \cdot \beta_{3W}) < 7.0$ wherein the reference symbol $f_W$ represents a focal length of the zoom lens system as a whole at the wide position thereof, the reference symbol $f_{123W}$ designates a total focal length of the first lens unit, the second lens unit and the third lens unit at the wide position, the reference symbol $f_{45W}$ designates a total focal length of the fourth lens unit and the fifth lens unit at the wide position, the reference symbols $\beta_{2W}$ and $\beta_{3W}$ represent lateral magnifications of the second lens unit and the third lens unit respectively at the wide position, and the reference symbols $\beta_{2T}$ and $\beta_{3T}$ designate lateral magnifications of the second lens unit and the third lens unit respectively at the tele position.

In order that the zoom lens system according to the present invention covers wide field angles and has a high vari-focal ratio, negative refractive powers are imparted to the second lens unit and the third lens unit, and the fourth lens unit and the fifth lens unit which have the positive refractive powers are moved, for zooming the lens system from the wide position to the tele position, so as to narrow an airspace reserved between the fourth lens unit and the fifth lens unit for correcting astigmatism, curvature of field, etc. sufficiently favorably. Further, an aperture stop is disposed at a location at which the zoom lens system is nearly symmetrical with regard to the aperture stop. Owing to the fact that the negative refractive powers are imparted to the second lens unit and the third lens unit, offaxial rays pass through marginal portions of the fourth lens unit and the fifth lens unit which have the positive refractive powers and compose a rear subsystem, whereby the fourth and fifth lens units have large diameters for preventing difficulty in correction of aberrations.

For the reason described above, the zoom lens systems according to the present invention selects the composition which has been described above and is configured so as to satisfy the conditions (1) through (3).

Owing to the fact that the negative refractive powers are imparted to the second lens unit and the third lens unit or the refractive power distribution described above is selected, it is possible to prevent the second lens unit from having an extremely strong refractive power. Further, this fact makes it possible to suppress production of aberrations by the second lens unit. Further, heights of incidence of the offacial rays are made low on the fourth lens unit by adequately distributing refractive powers between the second lens unit and the third lens unit. Furthermore, a composition of each of the lens units is selected so as not to increase a number of lens components unnecessarily and so as to prevent a front lens element from having a large diameter.

The above-mentioned condition (1) has been adopted for these purposes. If the lower limit of the condition (1)

is exceeded, an effect preferable for shortening a total length of the zoom lens system will be obtained, but it will be difficult to correct curvature of field and an effect undesirable for obtaining favorable optical performance will result in. If the upper limit of the condition (1) is exceeded, in contrast, effects desirable for reducing a number of lens components required for composing the zoom lens system and favorable correction of aberrations will be obtained, but effects undesirable for widening field angles and enhancing a vari-focal ratio of the zoom lens system will result in.

Then, the fourth lens unit and the fifth lens unit which compose the rear subunit have the positive refractive powers so as to correct curvature of field favorably over the entire zooming range from the wide position through an intermediate focal length to the tele position, and these lens units are moved independently of each other for varying a magnification of the zoom lens system while correcting aberrations with good balance. The condition (2) is required for configuring the zoom lens system compact, taking into consideration the variable airspace to be reserved between the fourth lens unit and the fifth lens unit as well as the refractive power distribution among the lens units.

If the lower limit of the condition (2) is exceeded, an effect desirable for configuring the zoom lens system compact will be obtained, but curvature of field and the other aberrations will undesirably be aggravated. If the upper limit of the condition (2) is exceeded, in contrast, a front subsystem will have a weakened refractive power and a large size for configuring the zoom lens system so as to have a high vari-focal ratio.

Further, it is important for configuring the zoom lens system compact to enhance a magnification effectively when the zoom lens system is to have a high vari-focal ratio. The condition (3) defines vari-focal ratios which are to be shared between the negative lens units.

If the lower limit of the condition (3) is exceeded, the rear subunit must bear an increased burden, whereby the fourth lens unit and the fifth lens unit will be moved for longer distances, and the zoom lens system will undesirably have a large total length. If the upper limit of the condition (3) is exceeded, in contrast, the negative lens units must bear increased burdens, curvature will be enhanced on lens surfaces used for correcting aberrations and cams adopted for zooming must have points of deflection, thereby undesirably posing a problem in manufacturing of the cams.

In order to configure the zoom lens system so as to have a compact size all the wide position thereof, it is important to strengthen refractive powers of the lens units to levels higher than required and not to degrade flatness of the image surface.

For obtaining good flatness of the image surface, it is desirable to dispose a sixth lens unit, which is to be kept stationary for zooming and has a positive refractive power, at a location on the image side of the fifth lens unit. Though this sixth lens unit may be moved for zooming, it is preferable to fix this lens unit for preventing a lens barrel from having a complicated structure. For enhancing flatness of the image surface and other purposes, it is desirable to configure the sixth lens unit so as to satisfy the following condition (4):

(4) $5.0 < f_6/f_M < 35.0$ wherein the reference symbol $f_6$ represents a focal length of the sixth lens unit and the reference symbol $f_M$ designates a total focal length of the first lens unit through the fifth lens unit.

If the lower limit of the condition (6) is exceeded, the sixth lens unit will have a strengthened refractive power and it will be necessary for correction of aberrations to compose the sixth lens unit of a plurality of lens components, thereby resulting in an effect undesirable for configuring the zoom lens system compact. If the upper limit of the condition (4) is exceeded, in contrast, a function for correcting the image surface will undesirably be lowered.

BRIEF DESCRIPTION OF THE DRAWINGS

FIG. 1 shows a sectional view illustrating a composition of a first embodiment of the zoom lens system according to the present invention;

FIG. 2 shows a diagram illustrating moving loci for lens units used in the first embodiment of the present invention;

FIG. 9 shows graphs illustrating aberration characteristics at the tele position of the first embodiment of the present invention;

FIG. 10 shows curves visualizing aberration characteristics at the wide position of a second embodiment of the present invention;

FIG. 11 shows curves visualizing aberration characteristics at the intermediate focal length of the second embodiment of the present invention;

FIG. 12 shows curves visualizing aberration characteristics at the tele position of the second embodiment of the present invention;

FIG. 13 shows graphs illustrating aberration characteristics at the wide position of the third embodiment of the present invention;

FIG. 14 shows graphs illustrating aberration characteristics at the intermediate focal length of the third embodiment of the present invention;

FIG. 15 shows graphs illustrating aberration characteristics at the tele-position of the third embodiment of the present invention;

FIG. 16 shows curves visualizing aberration characteristics at the wide position of a fourth embodiment of the present invention;

FIG. 17 shows curves visualizing aberration characteristics at the intermediate focal length of the fourth embodiment of the present invention;

FIG. 18 shows curves visualizing aberration characteristics at the tele position of the fourth embodiment of the present invention;

FIG. 19 shows graphs visualizing aberration characteristics at the wide position of a fifth embodiment of the present invention;

FIG. 20 shows graphs visualizing aberratzon characteristics at the intermediate focal length of the fifth embodiment of the present invention;

FIG. 21 shows graphs visualizing aberration characteristics at the tele position of the fifth embodiment of the present invention;

FIG. 22 shows graphs illustrating aberration characteristics at the wide position of the sixth embodiment of the present invention;

FIG. 23 shows graphs illustrating aberration charactetistics at the intermediate focal length of the sixth embodiment of the present invention;

FIG. 24 shows graphs illustrating aberration characteristics at the tele position of the sixth embodiment of the present invention;

FIG. 25 shows curves illustrating aberration characteristics at the wide position of the seventh embodiment of the present invention;

FIG. 26 shows curves illustrating aberration characteristics at the intermediate focal length of the seventh embodiment of the present invention.

DETAILED DESCRIPTION OF THE PREFERRED EMBODIMENTS

Figure 3A:
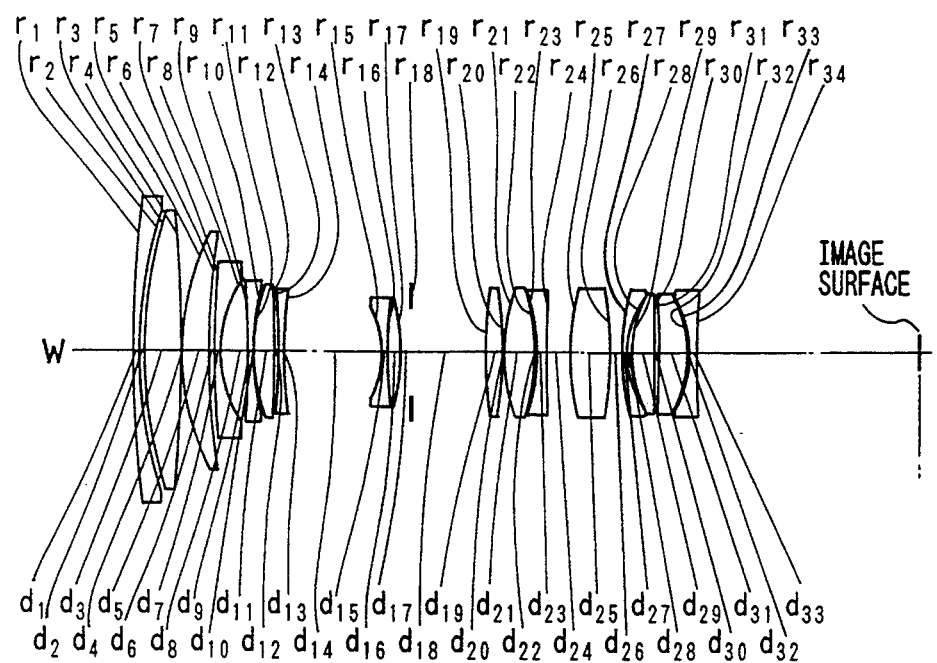
FIG. 3 shows a sectional view illustrating a composition of a thrid embodiment of the zoom lens system according to the present invention.

Now, the zoom lens system according to the present invention will be described more detailedly below with reference to the preferred embodiments illustrated in the accompanying drawings and numerial data given in a form of the following numerical data:

EMBODIMENT 1

$f = 29.300 \sim 60.494 \sim 131.221$,
$2\omega = 72.88° \sim 39.34° \sim 18.72° \sim F/4.650 \sim 5.100 \sim 5.800$

| | | | |
|---|---|---|---|
| $r_1 = 77.0915$ | | | |
| | $d_1 = 1.8000$ | $n_1 = 1.80518$ | $v_1 = 25.43$ |
| $r_2 = 46.7016$ | | | |
| | $d_2 = 0.4800$ | | |
| $r_3 = 49.2022$ | | | |
| | $d_3 = 6.7700$ | $n_2 = 1.69680$ | $v_2 = 55.52$ |
| $r_4 = 332.6239$ | | | |
| | $d_4 = 0.1200$ | | |
| $r_5 = 67.1941$ | | | |
| | $d_5 = 5.0300$ | $n_3 = 1.49700$ | $v_3 = 81.61$ |
| $r_6 = -11556.9695$ | | | |
| | $d_6 = D_1$ (variable) | | |
| $r_7 = -3114.5609$ | | | |
| | $d_7 = 1.1000$ | $n_4 = 1.83400$ | $v_4 = 37.16$ |
| $r_8 = 23.9087$ | | | |
| | $d_8 = 3.2614$ | | |
| $r_9 = 140.0742$ | | | |
| | $d_9 = 1.1000$ | $n_5 = 1.83481$ | $v_5 = 42.72$ |
| $r_{10} = 34.4378$ | | | |
| | $d_{10} = 0.1500$ | | |
| $r_{11} = 32.7345$ | | | |
| | $d_{11} = 3.8500$ | $n_6 = 1.84666$ | $v_6 = 23.78$ |
| $r_{12} = -417.8987$ | | | |
| | $d_{12} = 1.1000$ | $n_7 = 1.71300$ | $v_7 = 53.84$ |
| $r_{13} = 46.3873$ | | | |
| | $d_{13} = D_2$ (variable) | | |
| $r_{14} = -26.3954$ | | | |
| | $d_{14} = 1.1000$ | $n_8 = 1.58267$ | $v_8 = 46.33$ |
| $r_{15} = 28.6409$ | | | |
| | $d_{15} = 2.8978$ | $n_9 = 1.80518$ | $v_9 = 25.43$ |
| $r_{16} = -94.8010$ | | | |
| | $d_{16} = 1.6500$ | | |
| $r_{17} = \infty$ (stop) | | | |
| | $d_{17} = D_3$ (variable) | | |
| $r_{18} = 40.7038$ | | | |
| | $d_{18} = 3.0900$ | $n_{10} = 1.65160$ | $v_{10} = 58.52$ |
| $r_{19} = 1497.2437$ | | | |
| | $d_{19} = 0.1200$ | | |
| $r_{20} = 30.3708$ | | | |
| | $d_{20} = 5.2500$ | $n_{11} = 1.49700$ | $v_{11} = 81.61$ |
| $r_{21} = -53.5304$ | | | |
| | $d_{21} = 0.6841$ | | |
| $r_{22} = -32.6418$ (aspherical surface) | | | |
| | $d_{22} = 1.8500$ | $n_{12} = 1.84666$ | $v_{12} = 23.88$ |
| $r_{23} = 155.6688$ | | | |
| | $d_{23} = D_4$ (variable) | | |
| $r_{24} = 25.7399$ | | | |
| | $d_{24} = 6.0000$ | $n_{13} = 1.54041$ | $v_{13} = 51.00$ |
| $r_{25} = -48.8721$ | | | |
| | $d_{25} = 0.1500$ | | |
| $r_{26} = 29.2590$ | | | |
| | $d_{26} = 1.1000$ | $n_{14} = 1.83400$ | $v_{14} = 37.16$ |
| $r_{27} = 16.1128$ | | | |
| | $d_{27} = 0.3545$ | | |
| $r_{28} = 17.2694$ | | | |
| | $d_{28} = 2.7546$ | $n_{15} = 1.48749$ | $v_{15} = 70.20$ |
| $r_{29} = 28.0520$ | | | |

-continued $f = 29.300 \sim 60.494 \sim 131.221,$
$2\omega = 72.88° \sim 39.34° \sim 18.72° \sim F/4.650 \sim 5.100 \sim 5.800$

| | | | |
|---|---|---|---|
| | $d_{29} = 2.3593$ | $n_{16} = 1.75520$ | $v_{16} = 27.51$ |
| $r_{30} = 66.2395$ | | | |
| | $d_{30} = 1.6735$ | | |
| $r_{31} = -172.2618$ (aspherical surface) | | | |
| | $d_{31} = 1.1000$ | $n_{17} = 1.77250$ | $v_{17} = 49.66$ |
| $r_{32} = 44.3423$ | | | |
| | $d_{32} = D_5$ (variable) | | |
| $r_{33} = 35.8619$ | | | |
| | $d_{33} = 2.6500$ | $n_{18} = 1.56138$ | $v_{18} = 45.18$ |
| $r_{34} = 41.7893$ | | | | aspherical surface coefficients (22th surface) $E = 0.17917 \times 10^{-5}$, $F = 0.55485 \times 10^{-8}$
$G = -0.13869 \times 10^{-10}$, $H = 0.43644 \times 10^{-13}$
(31st surface) $E = -0.34320 \times 10^{-4}$, $F = -0.80261 \times 10^{-7}$
$G = 0.32524 \times 10^{-9}$, $H = -0.28653 \times 10^{-11}$

| | | | |
|---|---|---|---|
| f | 29.300 | 60.494 | 131.221 |
| $D_1$ | 0.904 | 9.993 | 25.421 |
| $D_2$ | 17.636 | 8.859 | 3.620 |
| $D_3$ | 12.958 | 6.709 | 1.000 |
| $D_4$ | 4.254 | 2.808 | 1.000 |
| $D_5$ | 0.850 | 23.058 | 40.881 |

$|f_{123W}/f_W| = 1.0$, $f_{45W}/f_{123W} = 0.926$
$(\beta_{2T} \cdot \beta_{3T})/(\beta_{2W} \cdot \beta_{3W}) = 2.058$, $f_6/f_M = 11.574$

EMBODIMENT 2

$f = 29.379 \sim 62.547 \sim 131.190,$
$2\omega = 72.72° \sim 38.16° \sim 18.72°, F/4.650 \sim 5.100 \sim 5.800$

| | | | |
|---|---|---|---|
| $r_1 = 188.7230$ | | | |
| | $d_1 = 1.1000$ | $n_1 = 1.80518$ | $v_1 = 25.43$ |
| $r_2 = 80.0883$ | | | |
| | $d_2 = 0.8750$ | | |
| $r_3 = 82.0747$ | | | |
| | $d_3 = 6.7700$ | $n_2 = 1.65830$ | $v_2 = 57.33$ |
| $r_4 = -324.0446$ | | | |
| | $d_4 = 0.1200$ | | |
| $r_5 = 47.7426$ | | | |
| | $d_5 = 5.0300$ | $n_3 = 1.49700$ | $v_3 = 81.61$ |
| $r_6 = 145.0290$ | | | |
| | $d_6 = D_1$ (variable) | | |
| $r_7 = 157.8783$ | | | |
| | $d_7 = 1.1000$ | $n_4 = 1.83400$ | $v_4 = 37.16$ |
| $r_8 = 20.4671$ | | | |
| | $d_8 = 4.3560$ | | |
| $r_9 = 386.5166$ | | | |
| | $d_9 = 1.1000$ | $n_5 = 1.83481$ | $v_5 = 42.72$ |
| $r_{10} = 40.9515$ | | | |
| | $d_{10} = 0.1500$ | | |
| $r_{11} = 29.4046$ | | | |
| | $d_{11} = 3.8500$ | $n_6 = 1.84666$ | $v_6 = 23.78$ |
| $r_{12} = 466.8890$ | | | |
| | $d_{12} = 0.6260$ | | |
| $r_{13} = -123.6235$ | | | |
| | $d_{13} = 1.1000$ | $n_7 = 1.71300$ | $v_7 = 53.84$ |
| $r_{14} = 76.4405$ | | | |
| | $d_{14} = D_2$ (variable) | | |
| $r_{15} = -18.9412$ | | | |
| | $d_{15} = 1.1000$ | $n_8 = 1.58267$ | $v_8 = 46.33$ |
| $r_{16} = 53.6212$ | | | |
| | $d_{16} = 2.3500$ | $n_9 = 1.80518$ | $v_9 = 25.43$ |
| $r_{17} = -42.6140$ | | | |
| | $d_{17} = 1.6500$ | | |
| $r_{18} = \infty$ (stop) | | | |
| | $d_{18} = D_3$ (variable) | | |
| $r_{19} = 61.8130$ | | | |
| | $d_{19} = 3.0900$ | $n_{10} = 1.65160$ | $v_{10} = 58.52$ |
| $r_{20} = -160.6582$ | | | |
| | $d_{20} = 0.1200$ | | |
| $r_{21} = 31.2118$ | | | |
| | $d_{21} = 5.7500$ | $n_{11} = 1.51728$ | $v_{11} = 69.56$ |
| $r_{22} = -38.3783$ | | | |
| | $d_{22} = 0.4150$ | | |
| $r_{23} = -32.4559$ | | | |
| | $d_{23} = 1.8500$ | $n_{12} = 1.80518$ | $v_{12} = 25.43$ |
| $r_{24} = 1340.8548$ | | | |
| | $d_{24} = D_4$ (variable) | | |

-continued $f = 29.379 \sim 62.547 \sim 131.190$,
$2\omega = 72.72° \sim 38.16° \sim 18.72°$, F/4.650~5.100~5.800

| | | | |
|---|---|---|---|
| $r_{25} = 35.0487$ | | | |
| | $d_{25} = 4.6000$ | $n_{13} = 1.51823$ | $\nu_{13} = 58.96$ |
| $r_{26} = -53.9500$ | | | |
| | $d_{26} = 0.2500$ | | |
| $r_{27} = 36.9032$ | | | |
| | $d_{27} = 1.2500$ | $n_{14} = 1.81554$ | $\nu_{14} = 44.36$ |
| $r_{28} = 17.7022$ | | | |
| | $d_{28} = 0.8240$ | | |
| $r_{29} = 22.7912$ | | | |
| | $d_{29} = 4.0000$ | $n_{15} = 1.56873$ | $\nu_{15} = 63.16$ |
| $r_{30} = -581.2026$ | | | |
| | $d_{30} = 0.7500$ | | |
| $r_{31} = -97.2185$ | | | |
| | $d_{31} = 5.6000$ | $n_{16} = 1.60342$ | $\nu_{16} = 38.01$ |
| $r_{32} = -22.0949$ | | | |
| | $d_{32} = 0.2500$ | | |
| $r_{33} = -22.4114$ (aspherical surface) | | | |
| | $d_{33} = 1.3500$ | $n_{17} = 1.81554$ | $\nu_{17} = 44.36$ |
| $r_{34} = 149.3850$ | | | |
| | $d_{34} = d_5$ (variable) | | |
| $r_{35} = 153.1605$ | | | |
| | $d_{35} = 2.5000$ | $n_{18} = 1.84666$ | $\nu_{18} = 23.88$ |
| $r_{36} = 199.7634$ | | | | aspherical surface coefficients
$E = -0.13504 \times 10^{-4}$, $F = 0.53136 \times 10^{-9}$
$G = 0.76594 \times 10^{-10}$, $H = -0.55306 \times 10^{-12}$

| f | 29.379 | 62.547 | 131.190 |
|---|---|---|---|
| $D_1$ | 0.904 | 12.947 | 28.936 |
| $D_2$ | 17.919 | 9.914 | 4.254 |
| $D_3$ | 12.485 | 5.589 | 1.000 |
| $D_4$ | 4.254 | 2.808 | 1.000 |
| $D_5$ | 0.500 | 23.350 | 43.658 |

$|f_{123W}/f_W| = 0.905$, $f_{45W}/f_{123W} = 1.159$
$(\beta_{2T} \cdot \beta_{3T})/(\beta_{2W} \cdot \beta_{3W}) = 2.027$, $f_6/f_M = 24.203$

EMBODIMENT 3

$f = 29.380 \sim 62.549 \sim 131.197$,
$2\omega = 72.72° \sim 38.16° \sim 18.72°$, F/4.650~5.100~5.800

| | | | |
|---|---|---|---|
| $r_1 = 233.1567$ | | | |
| | $d_1 = 1.1000$ | $n_1 = 1.80518$ | $\nu_1 = 25.43$ |
| $r_2 = 84.7808$ | | | |
| | $d_2 = 0.8750$ | | |
| $r_3 = 86.3229$ | | | |
| | $d_3 = 6.7700$ | $n_2 = 1.65830$ | $\nu_2 = 57.33$ |
| $r_4 = -266.1219$ | | | |
| | $d_4 = 0.1200$ | | |
| $r_5 = 48.9011$ | | | |
| | $d_5 = 5.0300$ | $n_3 = 1.49700$ | $\nu_3 = 81.61$ |
| $r_6 = 147.8481$ | | | |
| | $d_6 = D_1$ (variable) | | |
| $r_7 = 173.1009$ | | | |
| | $d_7 = 1.1000$ | $n_4 = 1.83400$ | $\nu_4 = 37.16$ |
| $r_8 = 21.9907$ | | | |
| | $d_8 = 5.1848$ | | |
| $r_9 = -204.5590$ | | | |
| | $d_9 = 1.1000$ | $n_5 = 1.83481$ | $\nu_5 = 42.72$ |
| $r_{10} = 47.4266$ | | | |
| | $d_{10} = 0.1500$ | | |
| $r_{11} = 34.7980$ | | | |
| | $d_{11} = 3.8500$ | $n_6 = 1.84666$ | $\nu_6 = 23.78$ |
| $r_{12} = -263.9791$ | | | |
| | $d_{12} = 0.6260$ | | |
| $r_{13} = -147.2674$ | | | |
| | $d_{13} = 1.1000$ | $n_7 = 1.71300$ | $\nu_7 = 53.84$ |
| $r_{14} = 99.1773$ | | | |
| | $d_{14} = D_2$ (variable) | | |
| $r_{15} = -18.8414$ | | | |
| | $d_{15} = 1.1000$ | $n_8 = 1.58267$ | $\nu_8 = 46.33$ |
| $r_{16} = 74.7264$ | | | |
| | $d_{16} = 2.3500$ | $n_9 = 1.80518$ | $\nu_9 = 25.43$ |
| $r_{17} = -43.9649$ | | | |
| | $d_{17} = 1.6500$ | | |
| $r_{18} = \infty$ (stop) | | | |
| | $d_{18} = D_3$ (variable) | | |
| $r_{19} = 93.5083$ | | | |

-continued $f = 29.380 \sim 62.549 \sim 131.197$,
$2\omega = 72.72° \sim 38.16° \sim 18.72°$, F/4.650~5.100~5.800

| | | | |
|---|---|---|---|
| $r_{20} = -76.6339$ | $d_{19} = 3.0900$ | $n_{10} = 1.61800$ | $v_{10} = 63.38$ |
| $r_{21} = 31.9577$ | $d_{20} = 0.1200$ | | |
| $r_{22} = -38.6803$ | $d_{21} = 5.7500$ | $n_{11} = 1.51823$ | $v_{11} = 58.96$ |
| $r_{23} = -35.8991$ | $d_{22} = 0.4150$ | | |
| $r_{24} = 253.1831$ | $d_{23} = 1.8500$ | $n_{12} = 1.80518$ | $v_{12} = 25.43$ |
| $r_{25} = 39.6199$ | $d_{24} = D_4$ (variable) | | |
| $r_{26} = -66.0525$ | $d_{25} = 7.6000$ | $n_{13} = 1.51602$ | $v_{13} = 56.80$ |
| $r_{27} = 39.8110$ | $d_{26} = 1.9955$ | | |
| $r_{28} = 18.8041$ | $d_{27} = 1.2500$ | $n_{14} = 1.83481$ | $v_{14} = 42.72$ |
| $r_{29} = 23.4837$ | $d_{28} = 0.8110$ | | |
| $r_{30} = -5089.7024$ | $d_{29} = 4.0000$ | $n_{15} = 1.61700$ | $v_{15} = 62.79$ |
| $r_{31} = -209.4050$ | $d_{30} = 0.7500$ | | |
| $r_{32} = -21.3935$ | $d_{31} = 5.6000$ | $n_{16} = 1.56732$ | $v_{16} = 42.83$ |
| $r_{33} = -21.3862$ (aspherical surface) | $d_{32} = 0.1617$ | | |
| $r_{34} = 214.7829$ | $d_{33} = 1.3500$ | $n_{17} = 1.78800$ | $v_{17} = 47.38$ | aspherical surface coefficients
$E = -0.83026 \times 10^{-5}$, $F = 0.98872 \times 10^{-8}$
$G = 0.71973 \times 10^{-11}$, $H = -0.37318 \times 10^{-13}$

| f | 29.380 | 62.549 | 131.197 |
|---|---|---|---|
| $D_1$ | 0.904 | 12.679 | 29.395 |
| $D_2$ | 17.823 | 10.215 | 4.538 |
| $D_3$ | 14.056 | 5.871 | 1.000 |
| $D_4$ | 4.254 | 2.808 | 1.000 |

$|f_{123W}/f_W| = 0.875$, $f_{45W}/f_{123W} = 1.195$
$(\beta_{2T} \cdot \beta_{3T})/(\beta_{2W} \cdot \beta_{3W}) = 1.99$

EMBODIMENT 4

$f = 29.379 \sim 62.548 \sim 131.192$,
$2\omega = 72.72° \sim 38.16° \sim 8.72°$, F/4.650~5.100~5.800

| | | | |
|---|---|---|---|
| $r_1 = 275.2120$ | $d_1 = 1.1000$ | $n_1 = 1.80518$ | $v_1 = 25.43$ |
| $r_2 = 88.6146$ | $d_2 = 0.8750$ | | |
| $r_3 = 92.1584$ | $d_3 = 6.7700$ | $n_2 = 1.65830$ | $v_2 = 57.33$ |
| $r_4 = -238.7270$ | $d_4 = 0.1200$ | | |
| $r_5 = 49.1163$ | $d_5 = 5.0300$ | $n_3 = 1.49700$ | $v_3 = 81.61$ |
| $r_6 = 151.0029$ | $d_6 = D_1$ (variable) | | |
| $r_7 = 168.9757$ | $d_7 = 1.1000$ | $n_4 = 1.81554$ | $v_4 = 44.36$ |
| $r_8 = 22.0975$ | $d_8 = 4.9029$ | | |
| $r_9 = -534.9234$ | $d_9 = 1.1000$ | $n_5 = 1.78590$ | $v_5 = 44.18$ |
| $r_{10} = 45.1430$ | $d_{10} = 0.1500$ | | |
| $r_{11} = 32.7540$ | $d_{11} = 3.8500$ | $n_6 = 1.84666$ | $v_6 = 23.88$ |
| $r_{12} = 188.2317$ | $d_{12} = 0.6260$ | | |
| $r_{13} = 1765.2482$ | $d_{13} = 1.1000$ | $n_7 = 1.73400$ | $v_7 = 51.49$ |
| $r_{14} = 87.7367$ | $d_{14} = D_2$ (variable) | | |
| $r_{15} = -18.7475$ | $d_{15} = 1.1000$ | $n_8 = 1.58267$ | $v_8 = 46.33$ |
| $r_{16} = 68.5179$ | | | |

-continued

| | f = 29.379~62.548~131.192, 2ω = 72.72°~38.16°~8.72°, F/4.650~5.100~5.800 | | |
|---|---|---|---|
| $r_{17} = -46.7268$ | $d_{16} = 2.3500$ | $n_9 = 1.80518$ | $v_9 = 25.43$ |
| $r_{18} = \infty$ (stop) | $d_{17} = 1.6500$ | | |
| $r_{19} = 102.5939$ | $d_{18} = D_3$ (variable) | | |
| $r_{20} = -64.8356$ | $d_{19} = 3.0900$ | $n_{10} = 1.61800$ | $v_{10} = 63.38$ |
| $r_{21} = 31.2917$ | $d_{20} = 0.1200$ | | |
| $r_{22} = -35.6773$ | $d_{21} = 5.7500$ | $n_{11} = 1.51823$ | $v_{11} = 58.96$ |
| $r_{23} = -34.2770$ | $d_{22} = 0.4150$ | | |
| $r_{24} = 382.8081$ | $d_{23} = 1.8500$ | $n_{12} = 1.80518$ | $v_{12} = 25.43$ |
| $r_{25} = 43.7380$ | $d_{24} = D_4$ (variable) | | |
| $r_{26} = -90.8442$ | $d_{25} = 7.6000$ | $n_{13} = 1.51602$ | $v_{13} = 56.80$ |
| $r_{27} = 42.2201$ | $d_{26} = 2.9322$ | | |
| $r_{28} = 19.4966$ | $d_{27} = 1.2500$ | $n_{14} = 1.83481$ | $v_{14} = 42.72$ |
| $r_{29} = 25.2414$ | $d_{28} = 1.0293$ | | |
| $r_{30} = 200.0658$ | $d_{29} = 4.0000$ | $n_{15} = 1.61700$ | $v_{15} = 62.79$ |
| $r_{31} = 1099.6310$ | $d_{30} = 0.7500$ | | |
| $r_{32} = -21.5864$ | $d_{31} = 5.6000$ | $n_{16} = 1.56732$ | $v_{16} = 42.83$ |
| $r_{33} = -20.7789$ (aspherical surface) | $d_{32} = 0.3637$ | | |
| $r_{34} = -851.0572$ | $d_{33} = 1.3500$ | $n_{17} = 1.78800$ | $v_{17} = 47.38$ | aspherical surface coefficients
$E = -0.51715 \times 10^{-5}$, $F = 0.10745 \times 10^{-7}$
$G = 0.15928 \times 10^{-10}$, $H = -0.68475 \times 10^{-14}$

| f | 29.379 | 62.548 | 131.192 |
|---|---|---|---|
| $D_1$ | 0.904 | 13.243 | 30.063 |
| $D_2$ | 17.107 | 9.933 | 4.512 |
| $D_3$ | 14.907 | 6.289 | 1.000 |
| $D_4$ | 4.254 | 2.808 | 1.000 |

$|f_{123W}/f_W| = 0.877$, $f_{45W}/f_{123W} = 1.181$
$(\beta_{2T} \cdot \beta_{3T})/(\beta_{2W} \cdot \beta_{3W}) = 1.950$

EMBODIMENT 5

| | f = 29.275~62.544~194.909, 2ω = 72.92°~38.16°~12.66°, F/4.650~5.100~5.797 | | |
|---|---|---|---|
| $r_1 = 112.7236$ | $d_1 = 1.0000$ | $n_1 = 1.84666$ | $v_1 = 23.88$ |
| $r_2 = 62.8563$ | $d_2 = 0.3766$ | | |
| $r_3 = 67.6458$ | $d_3 = 5.3500$ | $n_2 = 1.69680$ | $v_2 = 55.52$ |
| $r_4 = 1785.8395$ | $d_4 = 0.1000$ | | |
| $r_5 = 57.8493$ | $d_5 = 5.7892$ | $n_3 = 1.49700$ | $v_3 = 81.61$ |
| $r_6 = 628.7941$ | $d_6 = D_1$ (variable) | | |
| $r_7 = 12884.0401$ | $d_7 = 1.0000$ | $n_4 = 1.83481$ | $v_4 = 42.72$ |
| $r_8 = 27.4022$ | $d_8 = 2.9371$ | | |
| $r_9 = 145.5121$ | $d_9 = 1.0000$ | $n_5 = 1.83481$ | $v_5 = 42.72$ |
| $r_{10} = 36.4759$ | $d_{10} = 0.1500$ | | |
| $r_{11} = 34.8456$ | $d_{11} = 4.1813$ | $n_6 = 1.84666$ | $v_6 = 23.88$ |
| $r_{12} = -103.4639$ | $d_{12} = 0.1000$ | | |
| $r_{13} = -105.3854$ | | | |

-continued $f = 29.275 \sim 62.544 \sim 194.909$,
$2\omega = 72.92° \sim 38.16° \sim 12.66°$, F/4.650~5.100~5.797

| | | | |
|---|---|---|---|
| $r_{14} = 41.6391$ | $d_{13} = 1.0000$ | $n_7 = 1.79500$ | $\nu_7 = 45.29$ |
| $r_{15} = -37.5722$ | $d_{14} = D_2$ (variable) | | |
| $r_{16} = 27.2742$ | $d_{15} = 1.0000$ | $n_8 = 1.58900$ | $\nu_8 = 48.61$ |
| $r_{17} = 2858.4760$ | $d_{16} = 2.3928$ | $n_9 = 1.80518$ | $\nu_9 = 25.43$ |
| $r_{18} = \infty$ (stop) | $d_{17} = 1.0133$ | | |
| $r_{19} = 38.1813$ | $d_{18} = D_3$ (variable) | | |
| $r_{20} = 1943.2934$ | $d_{19} = 2.4405$ | $n_{10} = 1.65830$ | $\nu_{10} = 57.33$ |
| $r_{21} = 31.9335$ | $d_{20} = 0.1000$ | | |
| $r_{22} = -53.2192$ | $d_{21} = 4.0346$ | $n_{11} = 1.49700$ | $\nu_{11} = 81.61$ |
| $r_{23} = -32.4836$ (aspherical surface) | $d_{22} = 0.8036$ | | |
| $r_{24} = 376.4120$ | $d_{23} = 1.0000$ | $n_{12} = 1.84666$ | $\nu_{12} = 23.88$ |
| $r_{25} = 25.3004$ | $d_{24} = D_4$ (variable) | | |
| $r_{26} = -58.6972$ | $d_{25} = 5.6235$ | $n_{13} = 1.54072$ | $\nu_{13} = 47.20$ |
| $r_{27} = 34.9515$ | $d_{26} = 0.1500$ | | |
| $r_{28} = 16.5988$ | $d_{27} = 1.0000$ | $n_{14} = 1.83481$ | $\nu_{14} = 42.72$ |
| $r_{29} = 17.7112$ | $d_{28} = 0.3738$ | | |
| $r_{30} = 38.3591$ | $d_{29} = 3.4369$ | $n_{15} = 1.49700$ | $\nu_{15} = 81.61$ |
| $r_{31} = 39.6764$ | $d_{30} = 0.5500$ | | |
| $r_{32} = 162.2746$ | $d_{30} = 2.2375$ | $n_{16} = 1.74000$ | $\nu_{16} = 28.29$ |
| $r_{33} = -91.5226$ (aspherical surface) | $d_{32} = 1.6873$ | | |
| $r_{34} = 47.0749$ | $d_{33} = 4.5889$ | $n_{17} = 1.74320$ | $\nu_{17} = 49.31$ |
| $r_{35} = 36.8204$ | $d_{34} = D_5$ (variable) | | |
| $r_{36} = 45.1468$ | $d_{35} = 1.9072$ | $n_{18} = 1.49700$ | $\nu_{18} = 81.61$ | aspherical surface coefficients (23th surface) $E = 0.15025 \times 10^{-5}$, $F = 0.67694 \times 10^{-8}$
$G = -0.13059 \times 10^{-10}$, $H = 0.10743 \times 10^{-12}$
(33th surface) $E = -0.31782 \times 10^{-4}$, $F = -0.59515 \times 10^{-7}$
$G = 0.13714 \times 10^{-9}$, $H = -0.20150 \times 10^{-11}$

| f | 29.275 | 62.544 | 194.909 |
|---|---|---|---|
| $D_1$ | 1.000 | 13.407 | 39.563 |
| $D_2$ | 20.508 | 11.975 | 3.148 |
| $D_3$ | 14.344 | 8.992 | 1.000 |
| $D_4$ | 7.919 | 5.160 | 1.000 |
| $D_5$ | 0.758 | 24.337 | 36.647 |

$|f_{123W}/f_W| = 0.854$, $f_{45W}/f_{123W} = 1.235$
$(\beta_{2T} \cdot \beta_{3T})/(\beta_{2W} \cdot \beta_{3W}) = 3.433$, $f_6/f_M = 11.16$

EMBODIMENT 6

$f = 29.250 \sim 62.550 \sim 160.096$,
$2\omega = 72.88° \sim 38.10° \sim 15.36°$, F/4.646~5.100~5.800

| | | | |
|---|---|---|---|
| $r_1 = 161.7060$ | $d_1 = 1.0000$ | $n_1 = 1.84666$ | $\nu_1 = 23.88$ |
| $r_2 = 75.5637$ | $d_2 = 0.5190$ | | |
| $r_3 = 84.8417$ | $d_3 = 5.3500$ | $n_2 = 1.71300$ | $\nu_2 = 53.84$ |
| $r_4 = -545.5036$ | $d_4 = 0.1000$ | | |
| $r_5 = 54.3103$ | $d_5 = 6.1712$ | $n_3 = 1.49700$ | $\nu_3 = 81.61$ |
| $r_6 = 492.3156$ | $d_6 = D_1$ (variable) | | |

-continued $f = 29.250 \sim 62.550 \sim 160.096$,
$2\omega = 72.88° \sim 38.10° \sim 15.36°$, $F/4.646 \sim 5.100 \sim 5.800$

| | | | |
|---|---|---|---|
| $r_7 = 840.2819$ | | | |
| | $d_7 = 1.0000$ | $n_4 = 1.86300$ | $v_4 = 41.53$ |
| $r_8 = 30.7368$ | | | |
| | $d_8 = 3.1078$ | | |
| $r_9 = -474.2804$ | | | |
| | $d_9 = 1.0000$ | $n_5 = 1.83481$ | $v_5 = 42.72$ |
| $r_{10} = 29.7177$ | | | |
| | $d_{10} = 0.9315$ | | |
| $r_{11} = 31.6929$ | | | |
| | $d_{11} = 4.4298$ | $n_6 = 1.84666$ | $v_6 = 23.88$ |
| $r_{12} = -60.3922$ | | | |
| | $d_{12} = 0.1000$ | | |
| $r_{13} = -61.0418$ | | | |
| | $d_{13} = 1.0000$ | $n_7 = 1.79500$ | $v_7 = 45.29$ |
| $r_{14} = 60.9722$ | | | |
| | $d_{14} = D_2$ (variable) | | |
| $r_{15} = -32.9668$ | | | |
| | $d_{15} = 1.0000$ | $n_8 = 1.58900$ | $v_8 = 48.61$ |
| $r_{16} = 37.8426$ | | | |
| | $d_{16} = 1.9965$ | $n_9 = 1.80518$ | $v_9 = 25.43$ |
| $r_{17} = 452.8147$ | | | |
| | $d_{17} = 1.0924$ | | |
| $r_{18} = \infty$ (stop) | | | |
| | $d_{18} = D_3$ (variable) | | |
| $r_{19} = 34.9228$ | | | |
| | $d_{19} = 2.9363$ | $n_{10} = 1.67000$ | $v_{10} = 57.33$ |
| $r_{20} = -237.3379$ | | | |
| | $d_{20} = 0.1000$ | | |
| $r_{21} = 32.7873$ | | | |
| | $d_{21} = 4.1566$ | $n_{11} = 1.49700$ | $v_{11} = 81.61$ |
| $r_{22} = -55.0571$ | | | |
| | $d_{22} = 0.8266$ | | |
| $r_{23} = -32.2255$ (aspherical surface) | | | |
| | $d_{23} = 1.0000$ | $n_{12} = 1.84666$ | $v_{12} = 23.88$ |
| $r_{24} = -517.2579$ | | | |
| | $d_{24} = D_4$ (variable) | | |
| $r_{25} = 29.8393$ | | | |
| | $d_{25} = 4.6573$ | $n_{13} = 1.54072$ | $v_{13} = 47.20$ |
| $r_{26} = -67.6199$ | | | |
| | $d_{26} = 0.1500$ | | |
| $r_{27} = 30.1278$ | | | |
| | $d_{27} = 1.0632$ | $n_{14} = 1.81600$ | $v_{14} = 46.62$ |
| $r_{28} = 16.3830$ | | | |
| | $d_{28} = 0.0960$ | | |
| $r_{29} = 16.6898$ | | | |
| | $d_{29} = 3.5068$ | $n_{15} = 1.49700$ | $v_{15} = 81.61$ |
| $r_{30} = 41.3767$ | | | |
| | $d_{30} = 0.5500$ | | |
| $r_{31} = 45.4421$ | | | |
| | $d_{31} = 2.0664$ | $n_{16} = 1.74000$ | $v_{16} = 28.29$ |
| $r_{32} = 83.1446$ | | | |
| | $d_{32} = 1.1298$ | | |
| $r_{33} = -5285.6386$ (aspherical surface) | | | |
| | $d_{33} = 2.1165$ | $n_{17} = 1.74320$ | $v_{17} = 49.31$ |
| $r_{34} = 33.8261$ | | | |
| | $d_{34} = D_5$ (variable) | | |
| $r_{35} = 40.7211$ | | | |
| | $d_{35} = 3.0485$ | $n_{18} = 1.49700$ | $v_{18} = 81.61$ |
| $r_{36} = 69.6646$ | | | | aspherical surface coefficients (23th surface) $E = 0.10309 \times 10^{-5}$, $F = 0.11530 \times 10^{-7}$
$G = -0.14336 \times 10^{-10}$, $H = 0.16316 \times 10^{-12}$
(33th surface) $E = -0.34215 \times 10^{-4}$, $F = -0.55083 \times 10^{-7}$
$G = 0.57763 \times 10^{-10}$, $H = -0.11671 \times 10^{-11}$

| f | 29.250 | 62.550 | 160.096 |
|---|---|---|---|
| $D_1$ | 1.000 | 14.773 | 36.450 |
| $D_2$ | 17.314 | 10.385 | 3.353 |
| $D_3$ | 9.106 | 5.444 | 1.000 |
| $D_4$ | 7.475 | 3.992 | 1.000 |
| $D_5$ | 0.252 | 25.904 | 41.567 |

$|f_{123W}/f_W| = 0.6988$, $f_{45W}/f_{123W} = 0.900$
$(\beta_{2T} \cdot \beta_{3T})/(\beta_{2W} \cdot \beta_{3W}) = 2.944$, $f_6/f_M = 8.341$

EMBODIMENT 7

$f = 31.892 \sim 67.980 \sim 175.997$,
$2\omega = 72.22° \sim 35.26° \sim 14.00°$, $F/4.650 \sim 5.100 \sim 5.800$

| | | | |
|---|---|---|---|
| $r_1 = 139.4464$ | | | |
| | $d_1 = 1.1000$ | $n_1 = 1.84666$ | $\nu_1 = 23.88$ |
| $r_2 = 71.0297$ | | | |
| | $d_2 = 0.4990$ | | |
| $r_3 = 79.1678$ | | | |
| | $d_3 = 5.3500$ | $n_2 = 1.71300$ | $\nu_2 = 53.84$ |
| $r_4 = 3854.6637$ | | | |
| | $d_4 = 0.1000$ | | |
| $r_5 = 50.5349$ | | | |
| | $d_5 = 6.0470$ | $n_3 = 1.49700$ | $\nu_3 = 81.61$ |
| $r_6 = 368.8916$ | | | |
| | $d_6 = D_1$ (variable) | | |
| $r_7 = 356.1937$ | | | |
| | $d_7 = 1.2902$ | $n_4 = 1.86300$ | $\nu_4 = 41.53$ |
| $r_8 = 29.7320$ | | | |
| | $d_8 = 5.2483$ | | |
| $r_9 = -5468.0326$ | | | |
| | $d_9 = 1.1000$ | $n_5 = 1.83481$ | $\nu_5 = 42.72$ |
| $r_{10} = 30.3343$ | | | |
| | $d_{10} = 0.7968$ | | |
| $r_{11} = 31.9487$ | | | |
| | $d_{11} = 4.0985$ | $n_6 = 1.84666$ | $\nu_6 = 23.88$ |
| $r_{12} = -57.5965$ | | | |
| | $d_{12} = 0.1000$ | | |
| $r_{13} = -58.1871$ | | | |
| | $d_{13} = 1.1000$ | $n_7 = 1.79500$ | $\nu_7 = 45.29$ |
| $r_{14} = 55.4327$ | | | |
| | $d_{14} = D_2$ (variable) | | |
| $r_{15} = -35.6623$ | | | |
| | $d_{15} = 1.1000$ | $n_8 = 1.58900$ | $\nu_8 = 48.61$ |
| $r_{16} = 35.3865$ | | | |
| | $d_{16} = 2.1384$ | $n_9 = 1.80518$ | $\nu_9 = 25.43$ |
| $r_{17} = 223.1328$ | | | |
| | $d_{17} = 1.1987$ | | |
| $r_{18} = \infty$ (stop) | | | |
| | $d_{18} = D_3$ (variable) | | |
| $r_{19} = 34.9258$ | | | |
| | $d_{19} = 3.2386$ | $n_{10} = 1.67000$ | $\nu_{10} = 57.33$ |
| $r_{20} = -182.3108$ | | | |
| | $d_{20} = 0.1000$ | | |
| $r_{21} = 34.2885$ | | | |
| | $d_{21} = 4.4268$ | $n_{11} = 1.49700$ | $\nu_{11} = 81.61$ |
| $r_{22} = -54.7287$ | | | |
| | $d_{22} = 0.8321$ | | |
| $r_{23} = -32.9104$ (aspherical surface) | | | |
| | $d_{23} = 1.1000$ | $n_{12} = 1.84666$ | $\nu_{12} = 23.88$ |
| $r_{24} = -2086.8023$ | | | |
| | $d_{24} = D_4$ (variable) | | |
| $r_{25} = 29.2024$ | | | |
| | $d_{25} = 4.9008$ | $n_{13} = 1.54072$ | $\nu_{13} = 47.20$ |
| $r_{26} = -70.6983$ | | | |
| | $d_{26} = 0.1500$ | | |
| $r_{27} = 30.6175$ | | | |
| | $d_{27} = 1.1000$ | $n_{14} = 1.81600$ | $\nu_{14} = 46.62$ |
| $r_{28} = 16.8807$ | | | |
| | $d_{28} = 0.1000$ | | |
| $r_{29} = 17.1947$ | | | |
| | $d_{29} = 3.5030$ | $n_{15} = 1.49700$ | $\nu_{15} = 81.61$ |
| $r_{30} = 41.2628$ | | | |
| | $d_{30} = 0.5500$ | | |
| $r_{31} = 49.8084$ | | | |
| | $d_{31} = 1.9083$ | $n_{16} = 1.74000$ | $\nu_{16} = 28.29$ |
| $r_{32} = 102.3344$ | | | |
| | $d_{32} = 1.0692$ | | |
| $r_{33} = -456.1546$ (aspherical surface) | | | |
| | $d_{33} = 1.1000$ | $n_{17} = 1.74320$ | $\nu_{17} = 49.31$ |
| $r_{34} = 40.3305$ | | | |
| | $d_{34} = D_5$ (variable) | | |
| $r_{35} = 30.6137$ | | | |
| | $d_{35} = 1.2716$ | $n_{18} = 1.49700$ | $\nu_{18} = 81.61$ |
| $r_{36} = 31.8695$ | | | | aspherical surface coefficients
(23th surface) $E = 0.11729 \times 10^{-5}$, $F = 0.11747 \times 10^{-7}$
$G = -0.16977 \times 10^{-10}$, $H = 0.14873 \times 10^{-12}$
(33th surface) $E = -0.32803 \times 10^{-4}$, $F = -0.53269 \times 10^{-7}$
$G = 0.56441 \times 10^{-10}$, $H = -0.89374 \times 10^{-12}$

| | | | |
|---|---|---|---|
| f | 31.892 | 67.980 | 175.997 |
| $D_1$ | 1.000 | 15.613 | 36.695 |

-continued f = 31.892~67.980~175.997,
2ω = 72.22°~35.26°~14.00°, F/4.650~5.100~5.800

| | | | |
|---|---|---|---|
| $D_2$ | 16.589 | 11.257 | 3.328 |
| $D_3$ | 10.129 | 5.127 | 1.000 |
| $D_4$ | 8.566 | 4.877 | 1.000 |
| $D_5$ | 2.528 | 25.485 | 42.936 |

$|f_{123W}/f_W| = 0.645$, $f_{45W}/f_{123W} = 0.849$
$(\beta_{2T} \cdot \beta_{3T})/(\beta_{2W} \cdot \beta_{3W}) = 5.99$, $f_6/f_M = 34.811$ wherein the reference symbols $r_1, r_2, \ldots$ represent radii of curvature on surfaces of respective lens elements, the reference symbol $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

The first embodiment has the composition illustrated in FIG. 1, wherein the zoom lens system according to the present invention consists of six lens units having compositions described below. The first lens unit comprises at least one positive lens element and negative lens ele ment. The second lens unit comprises at least two negative lens components and one or more positive lens elements, whereas the third lens unit comprises at least one negative lens element. The fourth lens unit is composed of at least one positive lens element and a negative lens element, the fifth lens unit comprises at least two positive lens element and a negative lens element, and the sixth lens unit is composed of at least one lens element.

The second embodiment of the present invention has a composition which is similar to that of the first embodiment. For changing a magnification of each of the first embodiment and the second embodiment, the lens units are moved as illustrated in FIG. 2.

Figure 3B:
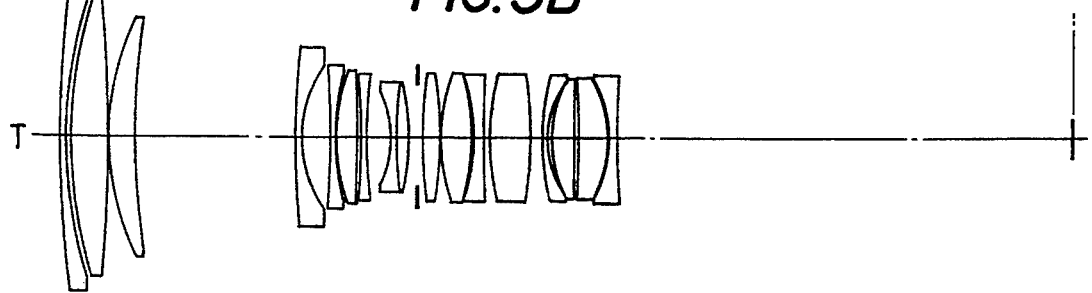

Each of the third embodiment and the fourth embodiment of the present invention has a composition illustrated in FIG. 3, wherein the zoom lens system according to the present invention consists of a first lens unit through a fifth lens unit, except for the sixth lens unit which is disposed in the composition of the first embodiment or the second embodiment. Further, each of the third embodiment and the fourth embodiment uses an aspherical surface for enhancing optical performance, or improving offaxial performance in particular, of the zoom lens system.

For changing a magnification of each of the third embodiment and the fourth embodiment from the wide position to the tele position thereof, the first lens unit through the fifth lens unit are moved as illustrated in FIG. 2, except for the sixth lens unit which is kept stationary in the first or second embodiment.

Figure 4A:
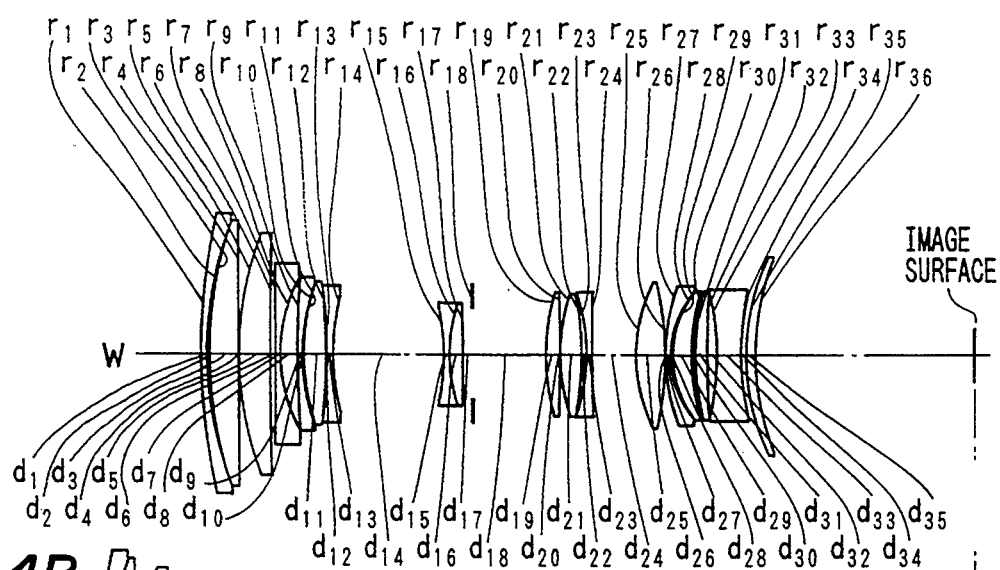
FIG. 4 shows a sectional view illustrating a composition of a fifth embodiment of the zoom lens system according to the present invention.
Figure 4B:
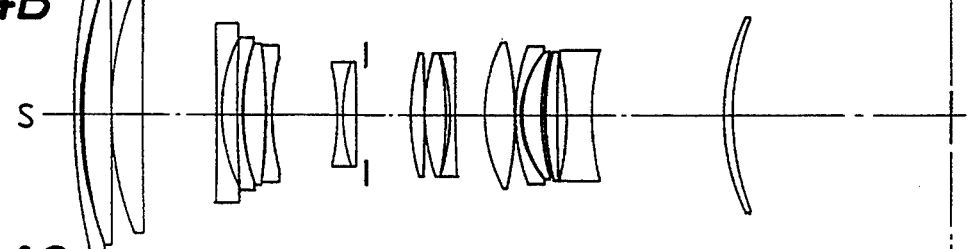
Figure 4C:
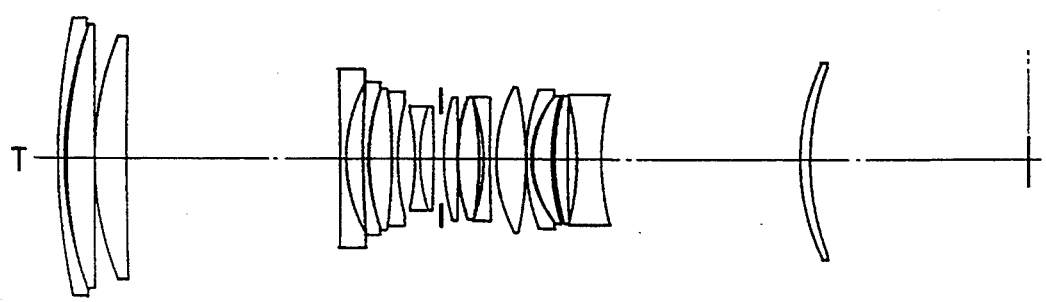
Figure 5A:
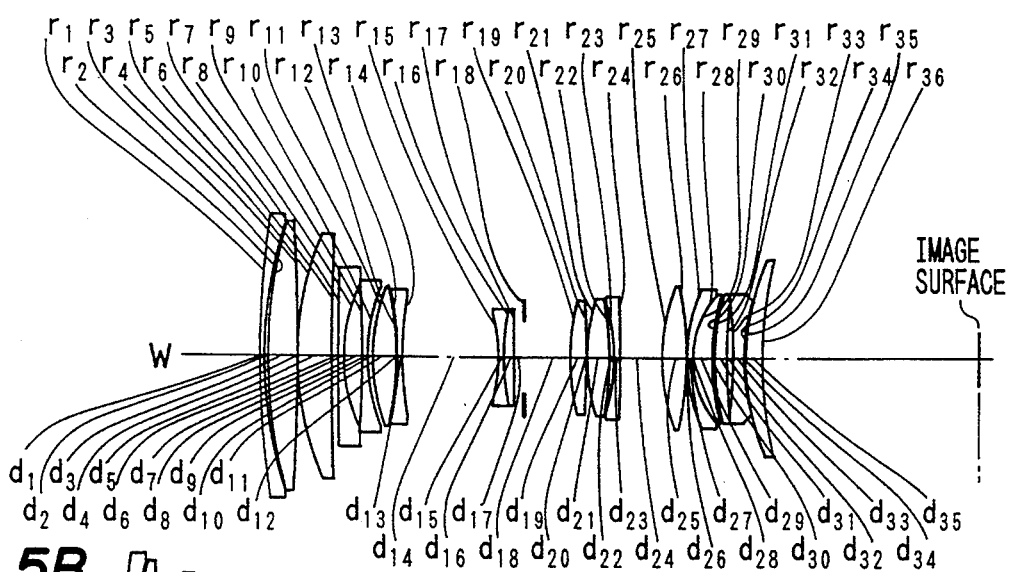
FIG. 5 and FIG. 6 show sectional views illustrating composition of sixth and seventh embodiments of the zoom lens system according to the present invention, respectively.
Figure 5B:
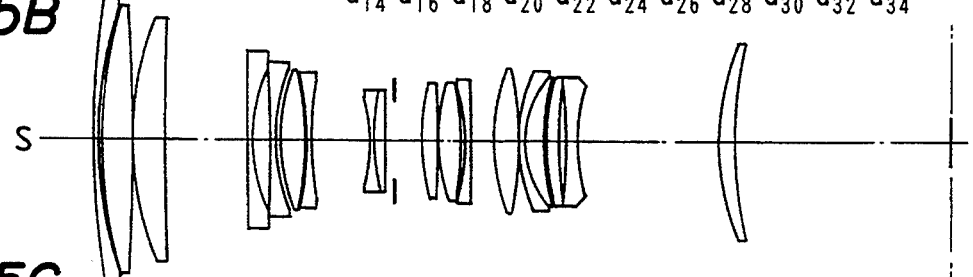
Figure 5C:
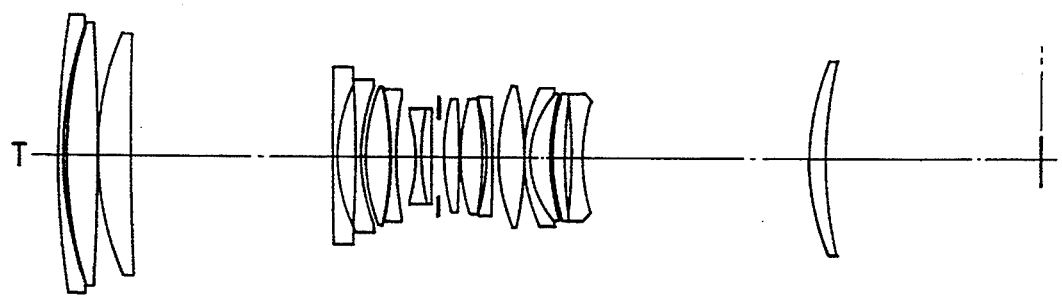
Figure 6A:
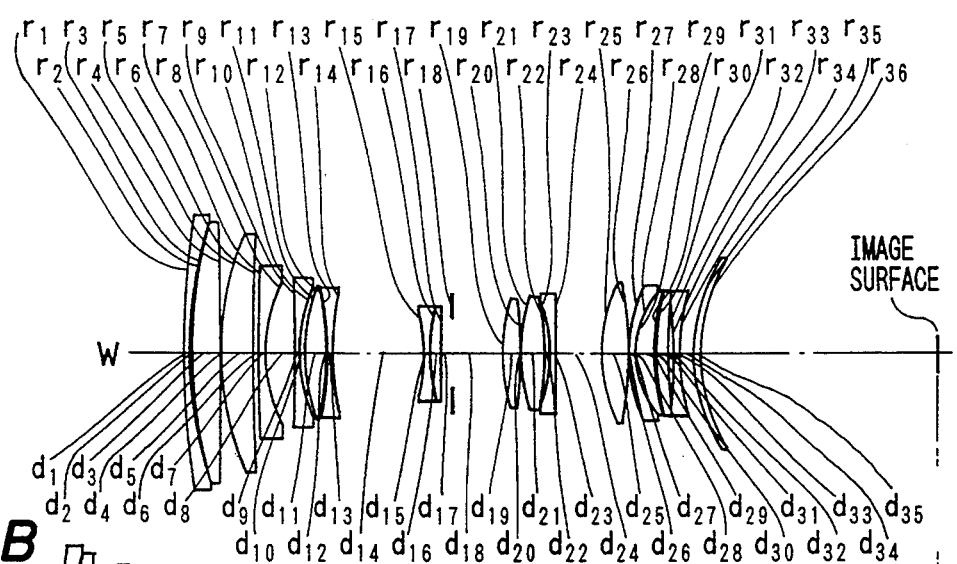
Figure 6B:
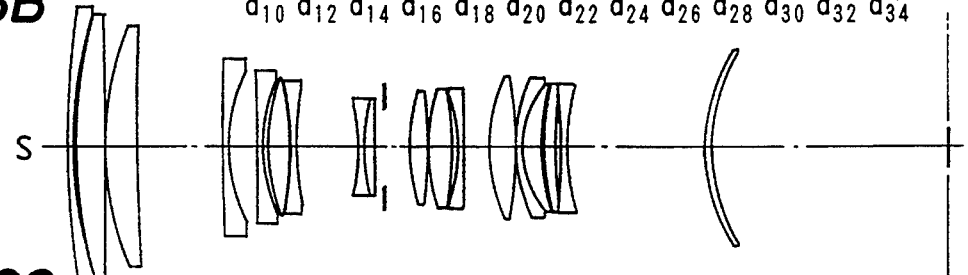
Figure 6C:
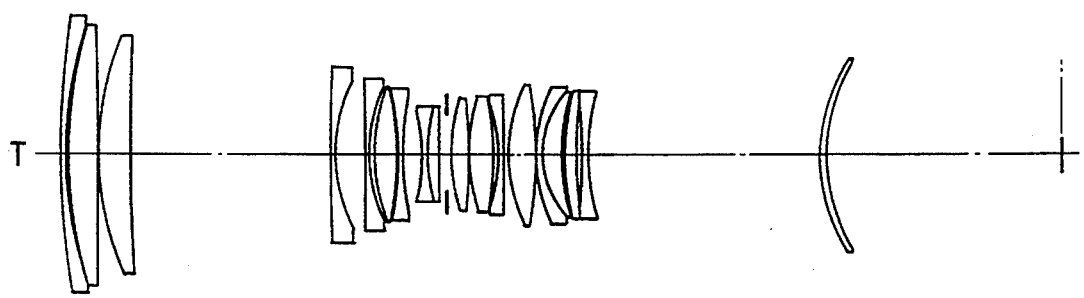
Figure 7A:
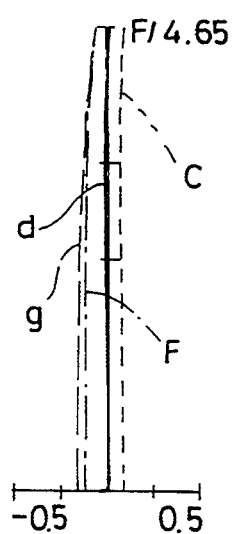
FIG. 7 shows graphs illustrating aberration characteristics at the wide position of the first embodiment of the present invention.
Figure 7B:
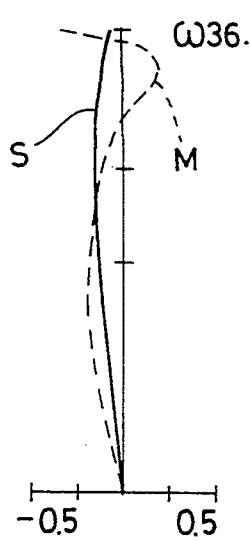
Figure 7C:
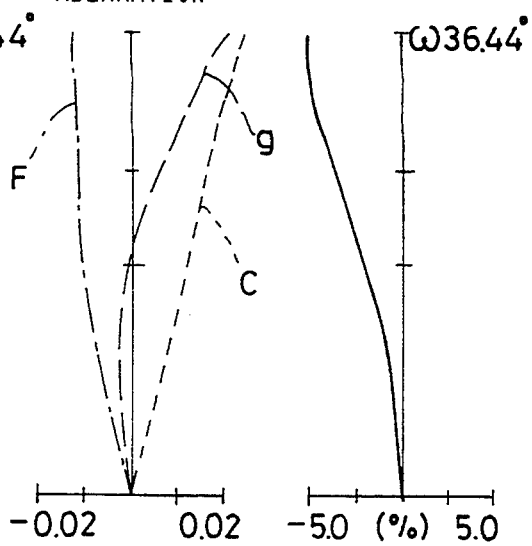
Figure 7D:
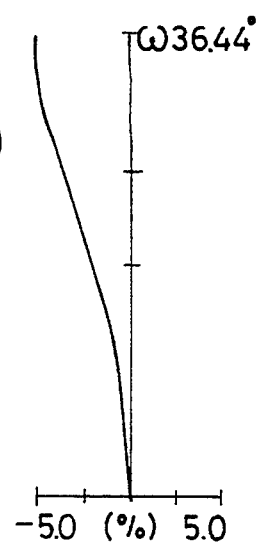
Figure 8A:
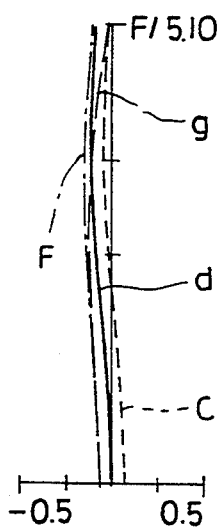
FIG. 8 shows graphs illustrating aberration characteristics at an intermediate focal length of the first embodiment of the present invention.
Figure 8B:
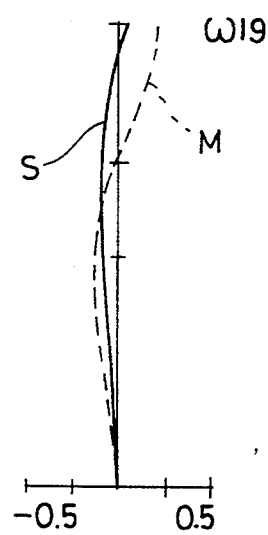
Figure 8C:
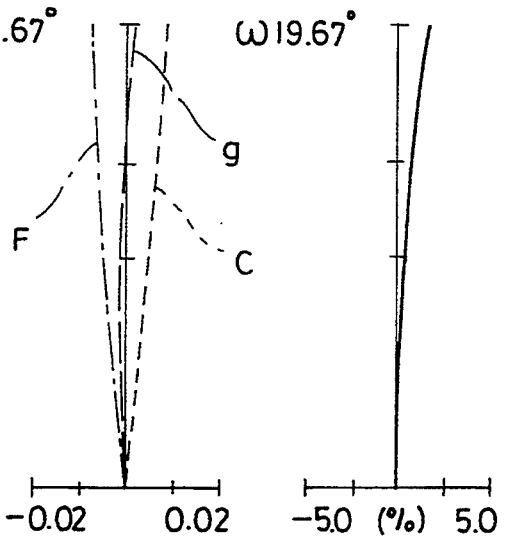
Figure 8D:
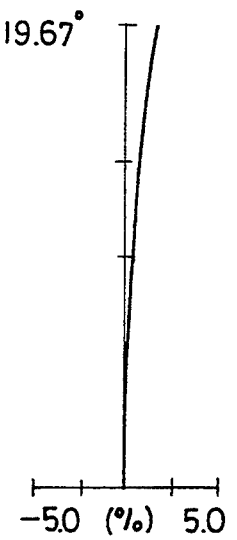
Figure 27A:
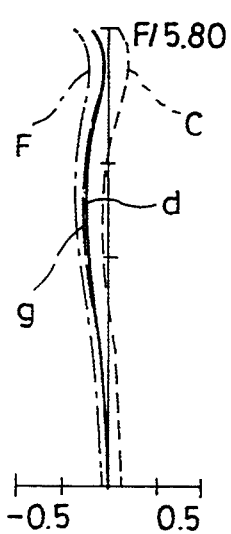
FIG. 27 shows curves illustrating aberration characteristics at the tele position of the seventh embodiment of the present invention.
Figure 27B:
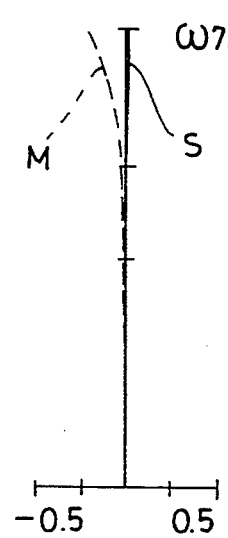
Figure 27C:
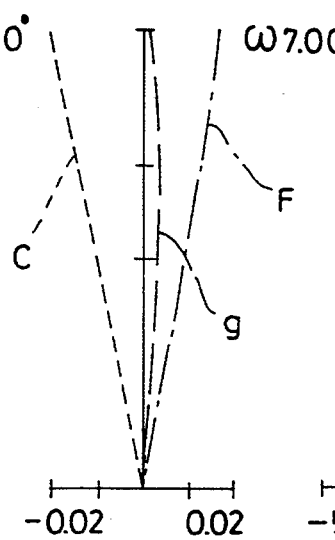
Figure 27D:
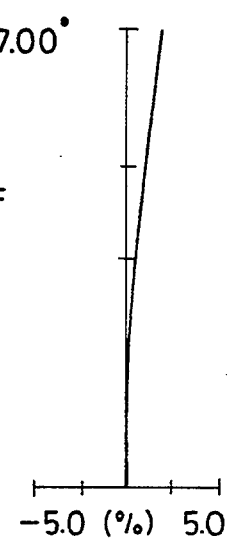

The fifth embodiment and the sixth embodiment of the present invention have compositions illustrated in FIG. 4 and FIG. 5 respectively, wherein the zoom lens system according to the present invention consists of the first through sixth lens units like that preferred as the first embodiment of the present invention.

Out of the embodiments of the present invention which have been described above, each of the first through fourth embodiments is designed for use with films having a size of 35 mm and has a focal length on the order of 29 mm to 131 mm. Further, the fifth embodiment has a focal length on the order of 29 mm to 105 mm.

In the zoom lens systems preferred as the embodiments described above, it is desirable to move the first lens unit and the fifth lens unit, for example, together with each other since such a movement makes it possible to integrate zooming cams. Further, it is possible to move the first lens unit and the fourth lens unit together with each other.

The aspherical surfaces which are used in the embodiments of the present invention have shapes expressed by the following formula:

$$x = \frac{Cy^2}{1 + \sqrt{1 - C^2 y^2}} + Ey^4 + Fy^6 + Gy^8 + Hy^{10} + \ldots$$

wherein a direction of an optical axis is taken as the x axis, a direction perpendicular to the optical axis is taken as the y axis, the reference symbol C represents $1/r$ (r: a radius of curvature as measured on a vertex of the aspherical surface), and the reference symbols E, F, G, H, . . . designate aspherical surface coefficients.

The zoom lens system according to the present invention is of a novel type which covers wide field angles, has a high vari-focal ratio, a short total length and a compact size, and features favorable optical performance.

I claim:

1. A zoom lens system comprising at least five lens units, in order from the object side, of: a first lens unit having a positive refractive power, a second lens unit having a negative refractive power, a third lens unit having a negative refractive power, a fourth lens unit having a positive refractive power and a fifth lens unit having a positive refractive power; wherein a magnification of said zoom lens system is changed from a wide position to a tele position thereof by moving the first lens unit rough the fifth lens unit along an optical axis and wherein said zoom lens system satisfies the following conditions (1), (2) and (3):

(1) $0.5 < -f_{123W}/f_W < 2.0$ (2) $0.3 < f_{45W}/f_W < 2.5$ (3) $1.5(\beta_{2T} \cdot \beta_{3T})/(\beta_{2W} \cdot \beta_{3W}) < 7.0$ wherein the reference symbol fW represents a focal length of said zoom lens system as a whole at the wide position thereof, the reference symbol $f_{123W}$ designates a total focal length of the first lens unit, the second lens unit and the third lens unit at the wide position, the reference symbol $f_{45W}$ denotes a total focal length of the fourth lens unit and the fifth lens unit at the wide position, the reference symbols $\beta_{2W}$ and $\beta_{3W}$ represent lateral magnifications of the second lens unit and the third lens unit respectively at the wide position, and the reference symbols $\beta_{2T}$ and $\beta_{3T}$ designate lateral magnifications of the second lens unit and the third lens unit respectively at the tele position.

2. A zoom lens system according to claim 1 wherein said zoom lens system consists only of the first lens unit, the second lens unit, the third lens unit, the fourth lens unit and the fifth lens unit.

3. A zoom lens system according to claim 1 wherein said zoom lens system comprises, on the image side of the fifth lens unit, a sixth lens unit which has a positive refractive power and is to be kept stationary for changing the magnification of said zoom lens system and said sixth lens unit satisfies the following condition (4):

(4) $5.0 < f_6 f_M < 35.0$ wherein the reference symbol $f_6$ represents a focal length of the sixth lens unit and the reference symbol $f_M$ designates a total focal length of the first lens unit through the fifth lens unit at the wide position.

* * * * *

UNITED STATES PATENT AND TRADEMARK OFFICE
CERTIFICATE OF CORRECTION

PATENT NO. : 5,442,485
DATED : August 15, 1995
INVENTOR(S) : YAMANASHI

It is certified that error appears in the above-identified patent and that said Letters Patent is hereby corrected as shown below:

Column 2, line 12, change

"(3) $1.5(\beta_{2T}\cdot\beta_{3T})/(\beta_{2W}\cdot\beta_{3W})<7.0$"

to

-- (3) $1.5<(\beta_{2T}\cdot\beta_{3T})/(\beta_{2W}\cdot\beta_{3W})<7.0$ --.

Column 22, line 55, change

"(3) $1.5(\beta_{2T}\cdot\beta_{3T})/(\beta_{2W}\cdot\beta_{3W})<7.0$"

to

-- (3) $1.5<(\beta_{2T}\cdot\beta_{3T})/(\beta_{2W}\cdot\beta_{3W})<7.0$ --.

Signed and Sealed this

Seventh Day of May, 1996

Attest:

BRUCE LEHMAN

*Attesting Officer*     Commissioner of Patents and Trademarks